(12) United States Patent
Ben-Yoseph et al.

(10) Patent No.: US 7,472,163 B1
(45) Date of Patent: Dec. 30, 2008

(54) BULK MESSAGE IDENTIFICATION

(75) Inventors: Roy Ben-Yoseph, Ashburn, VA (US); Sylvia M. Koschier, Oakton, VA (US)

(73) Assignee: AOL LLC, Dulles, VA (US)

( * ) Notice: Subject to any disclaimer, the term of this patent is extended or adjusted under 35 U.S.C. 154(b) by 922 days.

(21) Appl. No.: 10/330,285

(22) Filed: Dec. 30, 2002

Related U.S. Application Data

(60) Provisional application No. 60/416,295, filed on Oct. 7, 2002.

(51) Int. Cl.
*G06F 15/16* (2006.01)
(52) U.S. Cl. .................................................. 709/206
(58) Field of Classification Search ................. 709/206, 709/207, 204
See application file for complete search history.

(56) References Cited

U.S. PATENT DOCUMENTS

| | | | | |
|---|---|---|---|---|
| 5,627,764 | A * | 5/1997 | Schutzman et al. | 709/207 |
| 5,694,616 | A * | 12/1997 | Johnson et al. | 709/207 |
| 6,055,510 | A * | 4/2000 | Henrick et al. | 705/14 |
| 6,141,686 | A * | 10/2000 | Jackowski et al. | 709/224 |
| 6,144,934 | A * | 11/2000 | Stockwell et al. | 704/1 |
| 6,195,354 | B1 | 2/2001 | Skalecki et al. | |
| 6,199,102 | B1 * | 3/2001 | Cobb | 709/206 |
| 6,249,805 | B1 * | 6/2001 | Fleming, III | 709/206 |
| 6,301,608 | B1 * | 10/2001 | Rochkind | 709/206 |
| 6,321,267 | B1 * | 11/2001 | Donaldson | 709/229 |
| 6,393,464 | B1 * | 5/2002 | Dieterman | 709/206 |
| 6,829,635 | B1 * | 12/2004 | Townshend | 709/206 |
| 7,133,898 | B1 | 11/2006 | Malik | |
| 2001/0032245 | A1 * | 10/2001 | Fodor | 709/206 |
| 2002/0032602 | A1 * | 3/2002 | Lanzillo et al. | 705/14 |
| 2003/0009385 | A1 | 1/2003 | Tucciarone et al. | |
| 2003/0023736 | A1 * | 1/2003 | Abkemeier | 709/229 |
| 2003/0110212 | A1 | 6/2003 | Lewis | |
| 2003/0195937 | A1 * | 10/2003 | Kircher et al. | 709/207 |
| 2003/0231207 | A1 * | 12/2003 | Huang | 345/752 |
| 2006/0036701 | A1 | 2/2006 | Bulfer et al. | |

OTHER PUBLICATIONS

Habeas. "Habeas Frequently Asked Questions." Oct. 3, 2002. Retrieved from Internet Sep. 28, 2006.*
ftp://ftp.rfc-editor.org/in-notes/fyi/fyi38.txt T. Gavin et al., "How to Advertise Responsibility Using E-Mail and Newsgroups or—how Not to Make Enemies Fast!", , Nov. 7, 2002, pp. 1-28.
http://razor.sourceforge.net/, Vipul's Razor, Jun. 24, 2002, 23 pages.
http://msnbc-cnet.com.com/2100-1023-937300.html?tag=rn, "Start-up wants your help to fight spam," CNET News.com Review-700XL, Jun. 19, 2002, 3 pages.
http://msnbc-cnet.com.com/2100-1023-829399.html?tag=rn, "Net surfers set out to squelch spam," CNET News.com, Feb. 5, 2002, 4 pages.
http://msnbc-cnet.com.com/2104-10230938103.html, "The Big Picture," CNET News.com Review—700XL, Jun. 24, 2002, 2 pages.
http://msnbc-cnet.com.com/2100-1023-834044.html?tag=bp1st, "FTC prepares to bust spammers," Feb. 11, 2002, 2 pages.
http://msnbc-cnet.com.com/2100-1023-938103.html?type=pt&part=msnbc&tag=alert&form=f, "Anti-spam service battles bugs," Jun. 20, 2002, 3 pages.
T. Gavin et al., "How to Advertise Responsibly Using E-Mail and Newsgroups or—how Not to Make Enemies Fast!", ftp://ftp.rfc-editor.org/in-notes/fyi/fyi38.txt, Nov. 7, 2002, pp. 1-27.

* cited by examiner

*Primary Examiner*—William C. Vaughn, Jr.
*Assistant Examiner*—Scott Christensen
(74) *Attorney, Agent, or Firm*—Fish & Richardson P.C.

(57) ABSTRACT

Distinctively treating digital communications sent by bulk message senders includes providing a set of bulk sender behavior policies and monitoring compliance by a bulk message sender with the set of policies. Based on compliance by the bulk message sender with the set of policies, digital communications sent by the bulk message sender are distinctively treated.

77 Claims, 8 Drawing Sheets ically treating the digital communications may include providing different levels of distinctive treatment to digital communications sent by different bulk message senders based on different levels of compliance by those different bulk message senders. The different levels of treatment may include a low preferential treatment level and a high preferential treatment level. The low preferential treatment level may include allowing the digital communications to bypass filtering operations. The high preferential treatment level may include allowing the digital communications to bypass filtering operations and graphically distinguishing the digital communications from other received digital communications in a user interface provided at a recipient system.

BULK MESSAGE IDENTIFICATION

CLAIM OF PRIORITY

This application claims priority under 35 USC § 119(e) to U.S. Provisional Patent Application Ser. No. 60/416,295, filed on Oct. 7, 2002, the contents of which are hereby incorporated by reference.

This application references U.S. application Ser. No. 10/306,880 filed Nov. 27, 2002 and titled IDENTIFICATION AND FILTRATION OF DIGITAL COMMUNICATIONS, which is hereby incorporated by reference in its entirety for all purposes.

TECHNICAL FIELD

This document relates to digital communications systems, and more particularly to digital communications systems used to send messages in bulk.

BACKGROUND

Network systems enable communication of messages among computer systems. For example, an electronic mail system (or a compatible system) enables the communication of e-mail messages between computers attached to a network. Some messages transferred over the system may not be desired by their recipient. Such messages typically are referred to as spam. Spam messages may crowd the mailbox of a recipient to such an extent that desirable messages may go unnoticed and unread by the recipient. Spam filtering applications attempt to address this problem by identifying and filtering out spam prior to message storage. Such applications, however, frequently filter out messages desired by the recipient along with the spam.

SUMMARY

In one general aspect, distinctively treating digital communications sent by bulk message senders includes providing a set of bulk sender behavior policies and monitoring compliance by a bulk message sender with the set of policies. Based on compliance by the bulk message sender with the set of policies, digital communications sent by the bulk message sender are distinctively treated.

Implementations may include one or more of the following features. For example, the digital communications may be e-mails or instant messages. Distinctive treatment of the digital communications may include treating the digital communications sent by the bulk message sender distinctly from digital communications sent by other senders. Distinctive treatment also may include preferential treatment and may include allowing the digital communications to bypass filtering operations, such as spam filtering.

Distinctive treatment of the digital communications may include graphically distinguishing the digital communications from other digital communications in a user interface provided at a recipient system. Graphically distinguishing the digital communications may include placing an icon next to summary or title information for the digital communications displayed in the user interface. Graphically distinguishing the digital communications also may include displaying the text of the digital communications in a distinct color in the user interface.

Distinctive treatment of the digital communications may include enabling a recipient to separate the digital communications from other digital communications displayed in a user interface. Distinctive treatment of the digital communications also may include distinctively treating the digital communications based on a sender compliance data record corresponding to the bulk message sender.

Distinctive treatment of the digital communications may include providing different levels of distinctive treatment to digital communications sent by different bulk message senders based on different levels of compliance by those different bulk message senders. The different levels of treatment may include a low preferential treatment level and a high preferential treatment level. The low preferential treatment level may include allowing the digital communications to bypass filtering operations. The high preferential treatment level may include allowing the digital communications to bypass filtering operations and graphically distinguishing the digital communications from other received digital communications in a user interface provided at a recipient system.

The set of bulk sender behavior policies may include policies relating to a format of the digital communications and policies relating to a method of sending the digital communications. The bulk sender behavior policies may include a requirement that the bulk message sender not hide or forge sender-related information, provide in the digital communications non-Internet contact information, provide in the digital communications valid instructions on how a recipient may prevent future digital communications from being sent to the recipient by the bulk message sender, not send digital communications from a site with a dynamically assigned Internet Protocol address, not send more than a predetermined amount of digital communications that are returned to the bulk message sender as undeliverable over a predetermined time interval, accept more than a predetermined amount of digital communications that are returned to the bulk message sender as undeliverable over a predetermined time interval, provide information in the digital communications relating to their acquisition of an address of the intended recipient, send digital communications that are compliant with request for comments standards, and send the digital communications using relays that are closed to third party relaying.

When the digital communications comprise e-mails, the set of bulk sender behavior policies also may include a requirement that the bulk message sender send the digital communications using relays that have not hardcoded the mail exchange records of a mail system configured to receive the e-mails. The bulk sender behavior policies may further include a requirement that the bulk message sender not send future e-mails to an e-mail address of a recipient if an e-mail sent to the e-mail address is designated as undeliverable due to a permanent delivery failure.

Monitoring compliance by a bulk message sender with the set of policies may include tracking pattern information related to communications sent by the bulk message sender. The pattern information may include information related to the number of digital communications delivered successfully to the recipients, the number of digital communications designated as undeliverable and returned to the bulk message sender, and recipient feedback regarding the digital communications received from the bulk message sender. Monitoring compliance also may include generating a report that describes compliance of the bulk message sender with the policies over a predetermined time interval, and sending the report to the bulk message sender.

Monitoring compliance with the set of policies also may include turning on or off one or more compliance flags in a sender compliance data record corresponding to the bulk message sender. Distinctive treatment of the digital communications sent by the bulk message sender may be based on the one or more compliance flags in the sender compliance data record.

When the digital communications comprise e-mails, monitoring compliance may further include calculating a total number of e-mails sent by the bulk message sender over a predetermined time interval, calculating a total number of e-mails bounced back to the bulk message sender, and calculating a total number of bounced e-mails successfully received by the bulk message sender.

In another general aspect, a communications system that distinctively treats digital communications sent by a bulk message sender includes a data store and a message processing system. The data store stores sender compliance data records that indicate bulk message sender compliance with a set of bulk sender behavior policies. The message processing system receives a digital communication from a bulk message sender and distinctively treats the digital communication based on at least one of the sender compliance data records that corresponds to the bulk message sender. The message processing system enables access to the digital communication by a designated recipient in accordance with the distinctive treatment given to the digital communication.

Implementations may include one or more of the following features. For example, the communications system may include a recipient system that distinctively treats the digital communications based on the sender compliance data record corresponding to the bulk message sender. The message processing system may include a compliance monitoring computer that generates a report that describes compliance of the bulk message sender with the policies over a predetermined time interval. The compliance monitoring computer may send the report to the bulk message sender.

The message processing system may include a host mail system that includes a message identification and filtration system that receives and identifies the digital communications, and performs filtering operations in accordance with the distinctive treatment given to the digital communications. The host mail system may include a mailbox system that receives the digital communications from the message identification and filtration system and enables access to the digital communications by a designated recipient in accordance with the distinctive treatment given to the digital communications. The mailbox system also may distinctively treat the digital communications based on the sender compliance data record corresponding to the bulk message sender.

In another general aspect, approving a bulk message sender for distinctive treatment includes obtaining an agreement from the bulk message sender to comply with a set of bulk sender behavior policies. The bulk message sending system used by the bulk message sender to send digital communications is tested for compliance with the policies. A bulk message sender is approved for distinctive treatment based on the results of the testing.

In another general aspect, a user interface includes a first interface element that enables perception of at least one received digital file. The user interface also includes a second interface element that notifies a recipient of a digital communication that a sender of the digital communication is a bulk message sender complying with a set of bulk sender behavior policies.

Implementations may include one or more of the following features. For example, the second interface element may comprise a graphical element that distinguishes the digital communication from other digital communications. The graphical element may be an icon placed next to summary or title information of received digital communications displayed in the first interface element.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
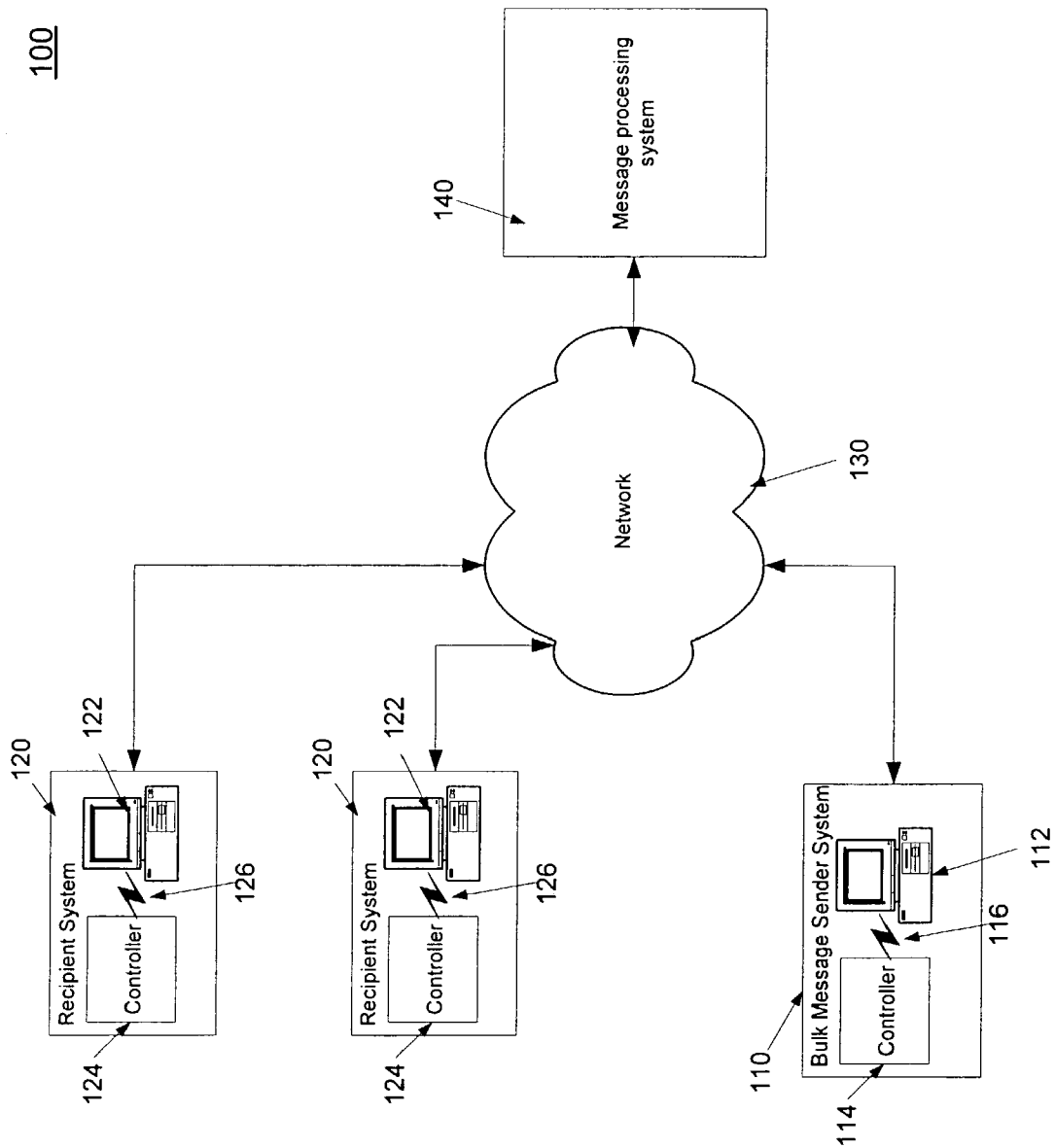
FIG. 1 is a block diagram illustrating a communications system capable of distinctively treating digital communications sent by bulk message senders.

Bulk message senders typically send a large number of digital communications to a large number of recipients. The digital communications typically are digital files that may include, for example, electronic mail (e-mail), instant messages (IM's), or other messages or files including audio data, video data, general binary data, or text data (e.g., encoded in American Standard Code for Information Interchange (ASCII) format). The digital communications sent by bulk message senders may include advertisements of products, services, offers, or opportunities, or other marketing/promotional materials. The number of digital communications sent by a bulk message sender may substantially exceed the number of digital communications that the bulk message sender receives in response from the digital communication destinations (e.g., approximately one response may be received per one hundred digital communications sent).

In an e-mail context, bulk message senders may be referred to as bulk mail senders and may be distinguished from spammers in several respects. For one, bulk mail senders typically are reputable marketers that provide useful and desired e-mails to targeted recipients, which e-mails tend not to be pornographic or sexually explicit. Spammers, on the other hand, typically employ dishonest techniques to send the electronic equivalent of junk mail to vast numbers of recipients. Unfortunately for bulk mail senders, e-mails sent by bulk mail senders frequently are confused with spam e-mails and are either blocked by spam filters or lost among the multitudes of spam e-mails that a recipient may receive.

In one general implementation, a communications system distinctively treats digital communications sent by bulk message senders that comply with bulk sender behavior policies. Distinctively treating digital communications typically involves treating the digital communications received from the bulk message sender distinctly from digital communications received from other senders. In some implementations, distinctively treating the digital communications involves preferentially treating the digital communications (i.e., treating the digital communications in a way that benefits the bulk message sender). The communications system may be used to monitor bulk message sender compliance with bulk sender behavior policies and to distinguish or distinctively treat digital communications sent by bulk message senders that behave in accordance with the bulk sender behavior policies.

In general, bulk sender behavior policies are policies that a bulk message sender may follow to obtain the status of a reputable and trusted marketer or entity. For example, in an e-mail-oriented implementation, the bulk mail sender may comply with bulk mail policies (i.e., bulk sender behavior policies directed to e-mail) to differentiate itself from a spammer (i.e., a sender of electronic junk mail). Bulk sender behavior policies typically include policies relating to the format of the digital communications (i.e., the presentation and contents of the communication) and/or the method of sending the digital communications (e.g., whether the communication was sent anonymously or whether the communication was sent from a secure system).

In one specific implementation, the communications system is an e-mail system that preferentially treats e-mails sent from a bulk mail sender by allowing the e-mails to bypass spam filtering and by using an icon to visually distinguish the e-mails from spam e-mails displayed to a recipient. In the e-mail system, a bulk mail sender system sends an e-mail to one or more recipient systems through a network and a host mail system. The host mail system includes a data store containing a sender compliance data record for each identified bulk mail sender. The sender compliance data record includes a compliance flag that is turned ON if the bulk mail sender agrees to and complies with a set of bulk mail policies designed to differentiate bulk mail senders from spammers. The host mail system allows the e-mail sent by the bulk mail sender to bypass some or all of the spam filtering of the host mail system if the compliance flag of the sender compliance data record associated with the bulk mail sender is turned ON. The host mail system also turns ON a flag bit in the header section of the e-mail if the compliance flag of the sender compliance data record is turned ON. When the recipient system receives the e-mail, the recipient system examines the flag bit, and, if the flag bit is turned ON, the recipient system displays an "approved bulk mail sender" icon next to the displayed header information of the e-mail. The icon allows the recipient of the e-mail to visually distinguish between the e-mail sent by the bulk mail sender and spam e-mails.

The host mail system also includes a compliance monitoring computer that monitors whether each identified bulk mail sender is complying with the bulk mail policies. The compliance monitoring computer periodically generates sender compliance reports that indicate sender compliance status, and sends the reports automatically to bulk mail senders using e-mail. The compliance monitoring computer also generates and modifies sender compliance data records based on the compliance of each bulk mail sender.

In another specific implementation, the e-mail system provides two levels of preferential treatment based on the extent of compliance of the bulk mail sender to bulk mail policies. A bulk mail sender is initially placed on a "white list" and receives a lower level of preferential treatment (e.g., e-mails sent by the bulk mail sender bypass all spam filters). If the bulk mail sender complies with the bulk mail policies for an extended period of time, the bulk mail sender is placed on an "approved bulk mail sender" list and receives a higher level of preferential treatment (e.g., e-mails sent by the approved bulk mail sender bypass all spam filters and are visually distinguished from other e-mails when depicted in a user interface at a recipient system). The communications system keeps track of the two levels of preferential treatment by using two compliance flags in each sender compliance data record.

In other implementations, these techniques are applied to communication systems other than e-mail. For instance, policies may be established for instant messaging communication that will enable differentiation between bulk/legitimate instant messaging sources/senders and spam/illegitimate sources/senders. The policies used to regulate instant messages may be based on instant messaging communications, or they may be based on policies for an e-mail system such that instant message sources/senders are authenticated based on their e-mail compliance with bulk e-mail policies, or some combination of compliance with policies for various communication platforms.

Referring to FIG. 1, a communications system 100 capable of distinctively treating digital communications sent by bulk message senders includes a bulk message sender system 110 that is able to send a digital communication to one or more recipient systems 120 through a network 130 and a message processing system 140. The digital communications sent by a bulk message sender may be awarded distinctive treatment if the bulk message sender complies with specified bulk sender behavior policies.

The bulk message sender system 110 is configured to send a digital communication to one or more recipient systems 120 through the message processing system 140. The bulk message sender system 110 may include a device 112 capable of executing instructions under the command of a controller 114. The device 112 may be a general purpose computer such as a workstation or personal computer. The controller 114 commands and directs communications between the device 112 of the system 110 and the message processing system 140. The controller 114 may be a software application that enables digital communications to be sent to the message processing system 140 using a file transfer protocol such as, for example, Simple Mail Transfer Protocol (SMTP). The device 112 may be connected to the controller 114 by a wired or wireless data pathway 116 capable of delivering data.

The recipient system 120 is configured to receive a digital communication from the bulk message sender system 110 by accessing the message processing system 140 through the network 130. The recipient system 120 typically includes a device 122 capable of executing instructions under the command of a controller 124. The device 122 may be a general purpose computer such as a workstation or personal computer. The controller 124 may command and direct communications between the device 122 of the recipient system 120 and the message processing system 140. The controller 124 may be a digital communications interface application that enables receipt of digital communications from the message processing system 140 using a file transfer protocol. In an e-mail-oriented implementation, the digital communications interface application may be an e-mail application and the file transfer protocol may be, for example, Post Office Protocol (POP) or Internet Message Access Protocol (IMAP). The device 122 may be connected to the controller 124 by a wired or wireless data pathway 126 capable of delivering data. In one implementation, the recipient system 120 also may send digital communications to the message processing system 140.

The recipient system 120 may distinguish or distinctively treat digital communications sent by bulk message senders that comply with bulk sender behavior policies. Recipient system 120 may alter the manner in which the digital communications are presented to the recipient and/or the manner in which the digital communications are processed by the digital communications interface application based on the compliance by the sender. In one particular example, the digital communications interface application may include a user interface that uses a graphical element or icon to denote digital communications that are received from bulk message senders that comply with bulk sender behavior policies. In another example, the digital communications interface application may use a different color font or place the digital communications in a separate folder or storage location to designate digital communications received from bulk message senders that comply with bulk sender behavior policies (e.g., instant messages from bulk message senders in compliance with the policies may be displayed in blue, and e-mails from bulk mail senders in compliance with the policies may be placed in a "bulk mail" folder). In an e-mail-oriented implementation, the e-mail application may designate an e-mail from a bulk mail sender complying with bulk mail policies by placing an icon next to the e-mail entry in a list of e-mails received by the recipient. The e-mail application also may allow the e-mail from the bulk mail sender to bypass some or all spam filtering normally provided by the e-mail application. Additionally or alternatively, e-mails from bulk mail senders that comply with bulk mail policies may be denoted by accompanying the receipt of the e-mails with a distinct audible cue, and/or by presenting bulk e-mail collectively to a recipient.

The network 130 is configured to enable direct or indirect communications between the bulk sender system 110, the recipient systems 120, and the message processing system 140. Examples of a network 130 include the Internet, the World Wide Web, Wide Area Networks (WANs), Local Area Networks (LANs), analog or digital wired and wireless telephone networks (e.g., Public Switched Telephone Network (PSTN), Integrated Services Digital Network (ISDN), and Digital Subscriber Line (xDSL)), radio, television, cable, satellite, and/or any other delivery or tunneling mechanism for carrying data.

The message processing system 140 may include one or more servers, processors, or intelligent devices configured to receive digital communications from the bulk message sender system 110 and process the digital communications distinctly based on compliance of the bulk message sender with bulk sender behavior policies. The message processing system 140 typically is configured to identify the bulk message sender that sent a digital communication and to determine the extent of compliance of the bulk message sender with bulk sender behavior policies (e.g., whether the sender agreed to observe the policies and/or whether the sender actually has observed the policies). Based on the extent of compliance, the message processing system 140 may handle the digital communications sent from the bulk message sender distinctly by, for example, modifying the digital communications to distinguish them from other digital communications, allowing the digital communications to bypass some or all filtering operations normally carried out by the message processing system 140, and/or immediately forwarding the digital communications to the recipient systems 120.

The message processing system 140 also may monitor the compliance of bulk message senders with bulk sender behavior policies and create, update, and maintain sender compliance data records in, for example, a data store. The compliance monitoring may be accomplished by identifying and tracking the sending patterns of bulk message senders. The sending patterns may include, but are not limited to, information relating to the number of digital communications delivered successfully to recipients, the number of digital communications designated as undeliverable and returned to the bulk message sender, and recipient feedback regarding the digital communications received from the bulk message sender.

The message processing system 140 may be configured to process different types of digital communications sent by the bulk message sender (e.g., e-mails and instant messages). The extent of compliance with bulk sender behavior policies may be used to distinguish digital communications sent by the bulk message sender across different communication platforms (e.g., compliance with bulk sender behavior policies may result in distinctly handling both e-mails and instant messages sent by the bulk message sender). In this manner, the bulk sender behavior policies may be employed as a general authentication mechanism used to legitimize the bulk message sender and distinguish all or multiple types of digital communications sent by the bulk message sender from those sent by other less trusted senders.

Figure 2:
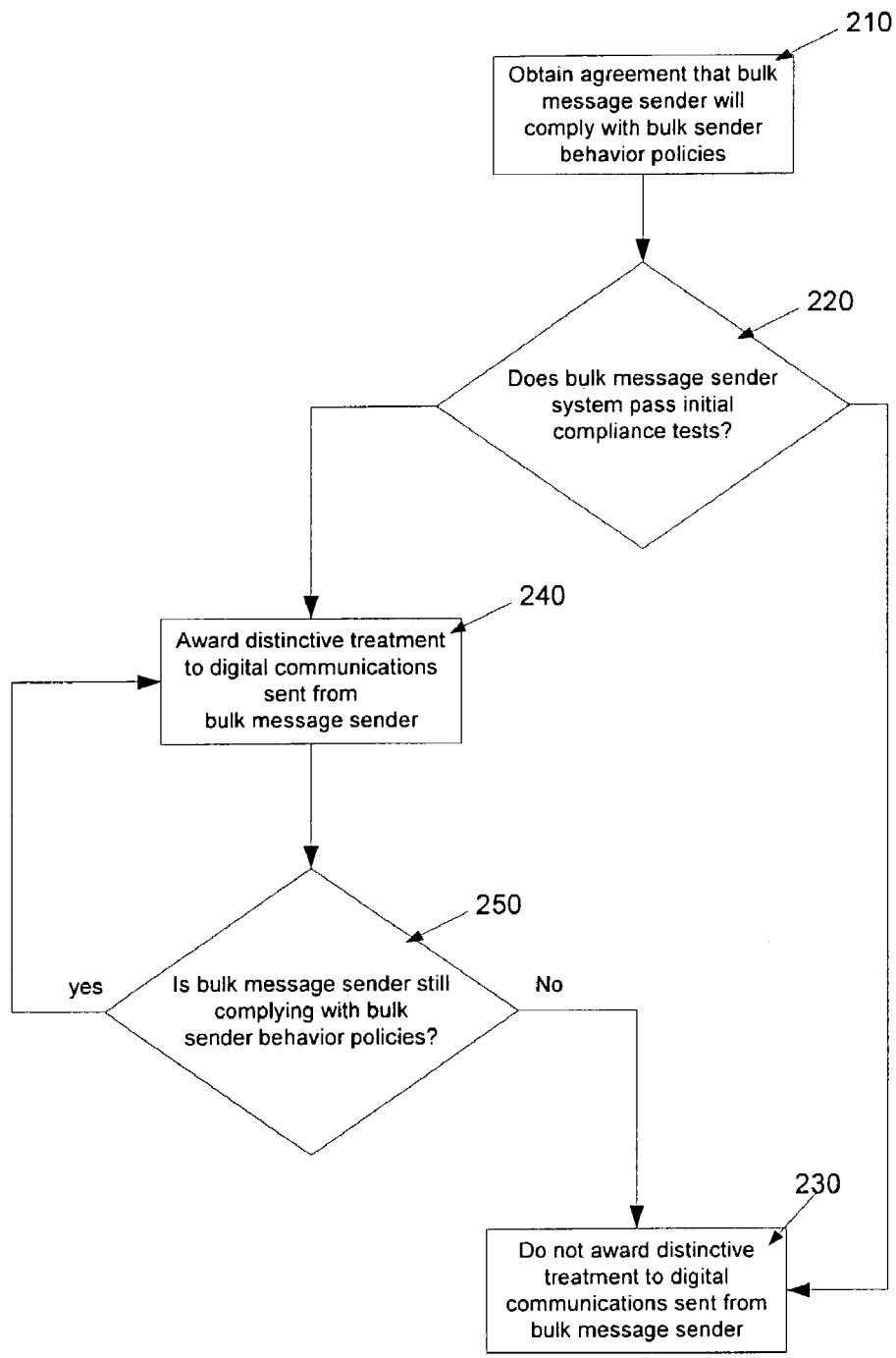
FIG. 2 is a flowchart illustrating an exemplary process for approving a bulk message sender for preferential treatment.

FIG. 2 shows a process 200 for approving a bulk message sender for distinctive treatment. The process 200 may include having the bulk message sender agree to comply with a set of bulk sender behavior policies (210). The ability of the bulk message sender to comply with the bulk sender behavior policies may be determined through one or more initial compliance tests (220). The initial compliance tests typically are used to verify that the bulk message sender system 110 is able to comply technically with the bulk sender behavior policies. For example, the initial compliance tests may be used to assess the security of the bulk message sender system 110 and the ability of the message processing system 140 to identify accurately the bulk message sender system 110 based on digital communications received from the bulk message sender system 110. If the bulk message sender system 110 does not pass the initial compliance tests, no distinctive treatment may be awarded to digital communications sent from the bulk message sender (230).

The bulk message sender system 110 passes the initial compliance tests, the recipient system 120 and/or the message processing system 140 may treat the digital communications sent from the bulk message sender distinctly from ordinary digital communications (240). The distinctive treatment awarded to the digital communications may vary depending on the extent of compliance (e.g., a higher level of compliance may result in greater preferential treatment than a lower level of compliance). The compliance of the bulk message sender with the bulk sender behavior policies may be monitored periodically over time (250). The monitoring may be performed automatically by the message processing system 140 based on the sending patterns of the bulk message sender or manually by system operators of the message processing system 140. Reports may be generated at regular intervals or may be triggered upon occurrence of an event. For example, a report may be generated when the behavior of the bulk message sender crosses a predetermined threshold of non-compliance (e.g., the number of digital communications unsuccessfully delivered surpasses a threshold number).

If the bulk message sender continues to comply with bulk sender behavior policies, the digital communications received from the bulk message sender continue to be handled distinctly from other digital communications. Depending on the extent of compliance of the bulk message sender with bulk sender behavior policies, the distinctive treatment awarded to digital communications received from the bulk message sender may change over time (e.g., initial preferential treatment may be lower than the preferential treatment provided when the bulk message sender has complied with the policies for an extended period of time). If, however, the bulk message sender is not complying with bulk sender behavior policies within a specified tolerance level, the digital communications sent by the bulk message sender may no longer be awarded distinctive treatment (230).

Figure 3:
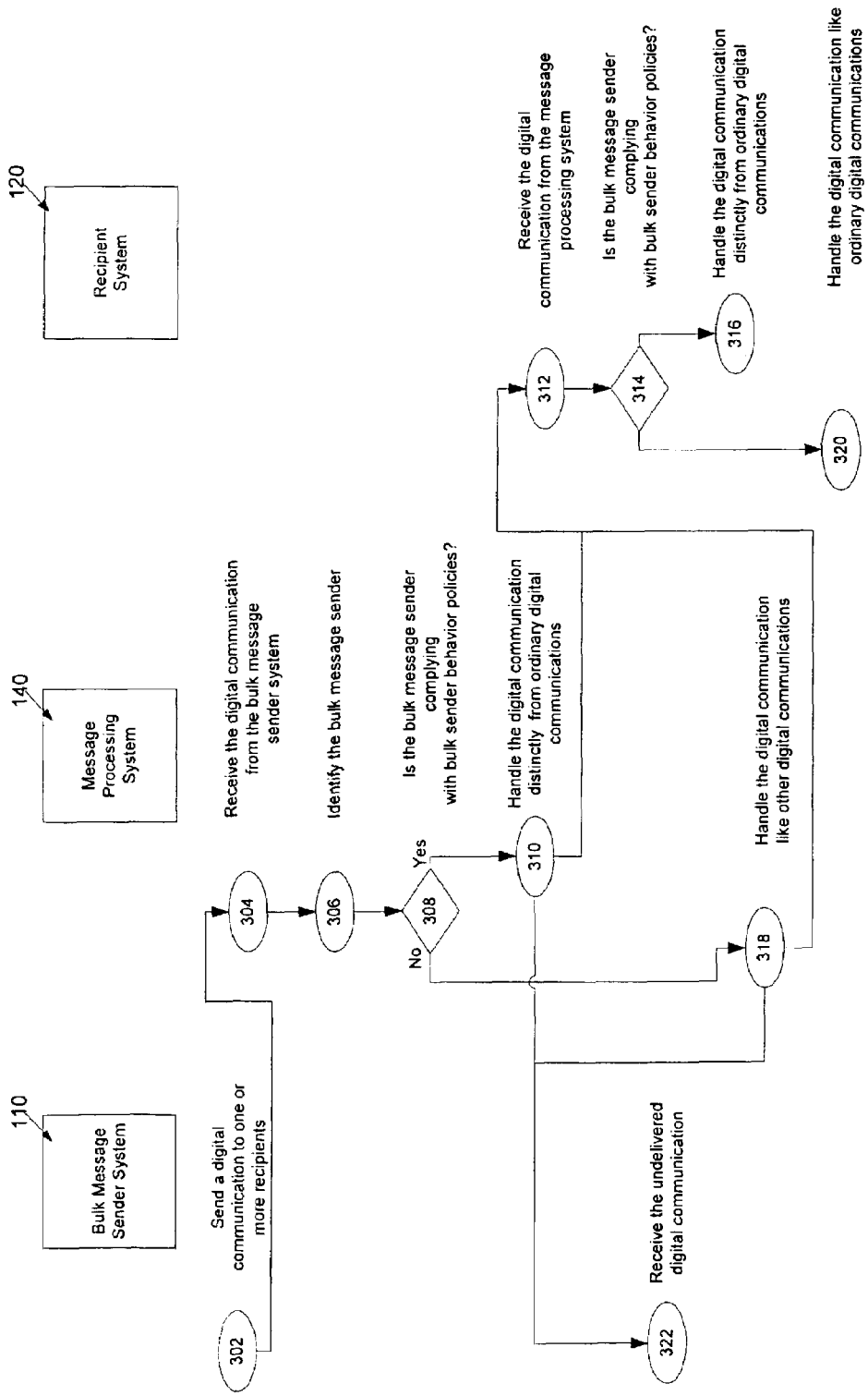
FIG. 3 is a flowchart illustrating an exemplary process used by the communications system of FIG. 1 to distinctively treat digital communications sent by a bulk message sender complying with bulk sender behavior policies.

FIG. 3 shows a process 300 used by the communications system 100 to distinctly treat digital communications sent by a bulk message sender complying with bulk sender behavior policies. Initially, the bulk message sender system 110 sends a digital communication to one or more recipients (302).

The message processing system 140 receives the digital communication from the bulk message sender system 110 (304) and identifies the bulk message sender by, for example, sender name, domain name, Internet Protocol (IP) address, and/or another identifier (306). Once the bulk message sender is identified, the message processing system 140 determines whether and to what extent the bulk message sender is complying with a set of bulk sender behavior policies by, for example, accessing a sender compliance data record associated with the identified bulk message sender (308).

If the bulk message sender is complying with the bulk sender behavior policies, the digital communication received from the bulk message sender may be handled by the message processing system 140 distinctly from ordinary digital communications (e.g., the digital communication may be allowed to bypass all filtering operations) (310). This distinctive treatment may vary depending on the extent of compliance. The handling of the digital communication may include one or more of the following operations: storing the digital communication, deleting the digital communication, sending the digital communication to the recipient system(s) 120, and/or returning the digital communication undelivered to the bulk message sender system 110 (i.e., "bouncing" the digital communication back to the sender).

When the digital communication is sent, the recipient system 120 receives the digital communication (312), determines that the bulk message sender is complying with bulk sender behavior policies (314), and handles the digital communication distinctly from ordinary digital communications (e.g., by visually distinguishing the digital communication from ordinary digital communications when depicted in a user interface) (316).

If the bulk message sender is not complying with bulk sender behavior policies, the digital communication received from the bulk message sender by the message processing system 140 is handled like an ordinary digital communication (318). Upon receipt of the digital communication (312), the recipient system 120 alternatively may determine that the bulk message sender is not complying with bulk sender behavior policies (314), and, upon such a determination, handles the digital communication like an ordinary digital communication (320).

Process 300 includes having both the message processing system 140 and the recipient system 120 determine whether the bulk message sender is complying with bulk sender behavior policies and provide the digital communication with distinctive treatment based on compliance with the bulk sender behavior policies. In other implementations, the recipient systems 120 or the message processing system 140, but not both, may make this determination and/or may provide the distinctive treatment.

Figure 4:
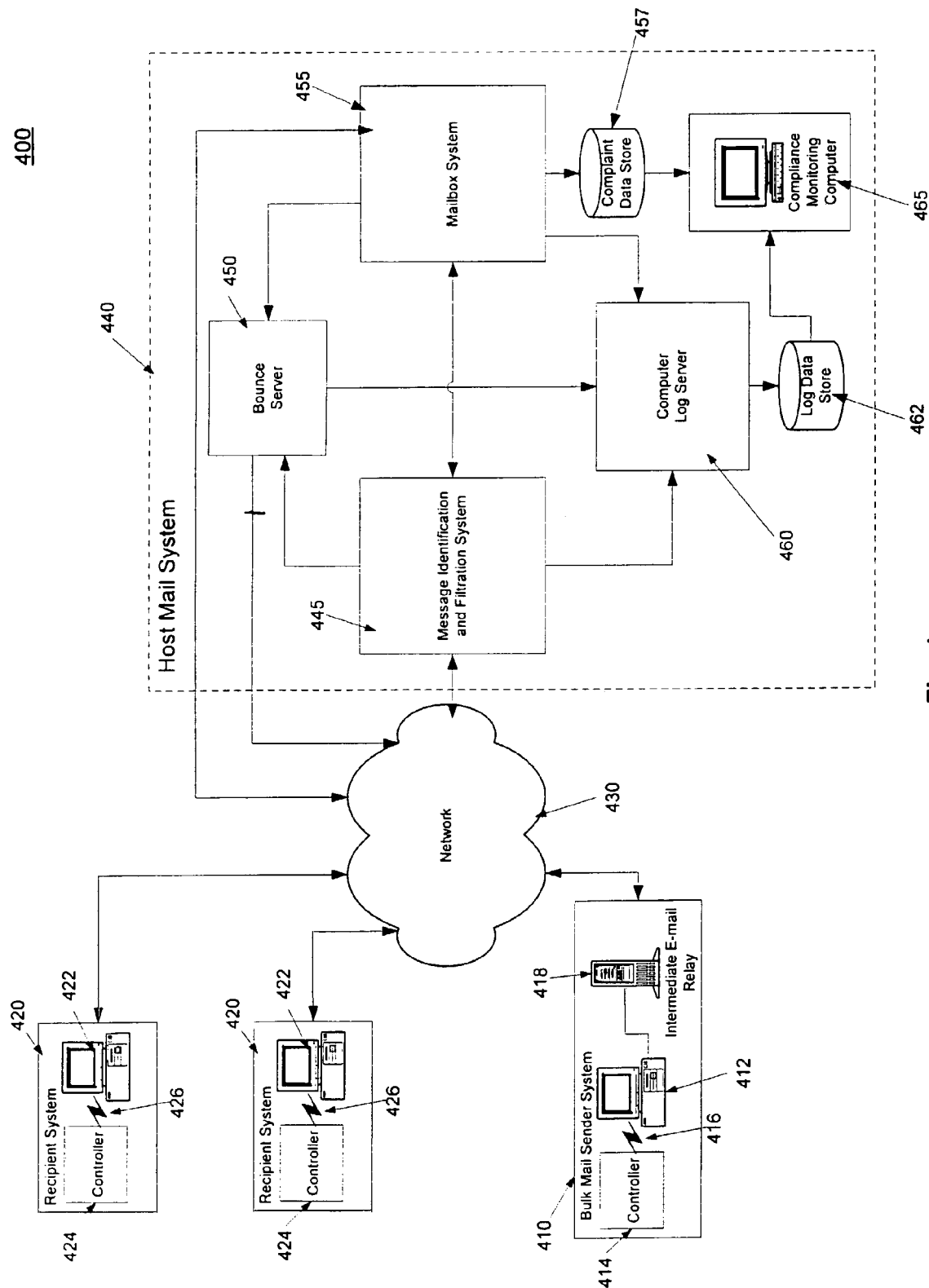
FIG. 4 is a block diagram illustrating an e-mail system capable of preferentially treating e-mails sent by bulk mail senders.

FIG. 4 shows an e-mail system 400 capable of distinguishing and preferentially treating e-mails sent by bulk mail senders. The system 400 includes a bulk mail sender system 410 able to send an e-mail to one or more recipient systems 420 through a network 430 and a host mail system 440. The bulk mail sender system 410 typically includes a device 412 capable of executing instructions under the command of a controller 414. The device 412 may be connected to the controller 414 by a wired or wireless data path 416. The recipient system 420 typically includes a device 422 capable of executing instructions under the command of a controller 424. The device 422 may be connected to the controller 424 by a wired or wireless data path 426.

Examples of each element within the e-mail system 400 of FIG. 4 are described broadly above with respect to FIG. 1. In particular, the bulk mail sender system 410, the device 412, the controller 414, the link 416, the recipient system 420, the device 422, the controller 424, the link 426, the network 430, and the host mail system 440 typically have attributes comparable to those described with respect to the bulk message sender system 110, the device 112, the controller 114, the link 116, the recipient system 120, the device 122, the controller 124, the link 126, the network 130, and the message processing system 140 of FIG. 1, respectively.

The bulk mail sender system 410 also may include an intermediate e-mail transfer server or relay 418 that accepts the e-mail from the device 412 and relays the e-mail to the host mail system 440. The intermediate server or relay may be local or remote to the device 412. In one implementation, the intermediate e-mail transfer server or relay may be a UNIX machine that communicates with the device 412 and the host mail system 440 using SMTP.

The recipient system 420 may be configured to identify e-mails sent by bulk mail senders behaving in compliance with bulk mail policies by, for example, examining the e-mail contents (e.g., the contents may be modified by the host mail system 440 to indicate sender compliance), communicating with the host mail system 440 to verify sender status, and/or referencing a local or remote lookup table or equivalent to verify that the sender, as designated by sender name, domain name, IP address, and/or other identifier, is complying with bulk mail policies. In host-based mail systems, similar operations and functionality may be provided at a host to enable similar experiences by a recipient of bulk e-mail.

The host mail system 440 includes a message identification and filtration system 445, a bounce server 450, a mailbox system 455, a computer log server 460, and a compliance monitoring computer 465. The message identification and filtration system 445 is configured to accept e-mails from the bulk mail sender system 410, identify and filter the e-mails, and selectively forward some or all of the e-mails to the bounce server 450 and/or to the mailbox system 455. The message identification and filtration system 445 may be configured to identify and filter e-mails based on various factors including, but not limited to, the e-mail contents, the volume and pattern of e-mails sent by the bulk mail sender, and the complaints received from recipients regarding the e-mails or regarding the bulk mail sender. The message identification and filtration system 445 also may be configured to perform spam filtering (i.e., the identification and filtering of unsolicited and undesirable e-mails).

The message identification and filtration system 445 may be configured to filter out e-mails by deleting the e-mails or by sending the e-mails to the bounce server 450 for subsequent return to the bulk mail sender system 410. E-mails that are not filtered out are sent to the mailbox system 455 for storage.

The message identification and filtration system 445 may be configured to preferentially treat e-mails from bulk mail senders that comply with bulk mail policies by, for example, modifying the contents of the e-mails sent by the bulk mail sender to indicate preferred status and/or by allowing the e-mails to bypass some or all of the filtering. The e-mail contents may be modified to indicate preferred status by, for example, adding and/or turning ON a flag in the header of the e-mail and/or including specific text in the body of the e-mail. The identification and filtration system 445 may be configured to determine which senders are complying with bulk mail policies by, for example, accessing a local lookup table, or communicating with another computer, server, or device to request the status of the bulk mail sender.

The message identification and filtration system 445 may be a computer system including one or more general or special purpose computers. In one implementation, the message identification and filtration system 445 is a computer system composed of one or more UNIX machines that use a file transfer protocol such as SMTP to communicate with the bulk mail sender system 410, the one or more recipient systems 420, the bounce server 450, and the mailbox system 455.

The bounce server 450 is configured to receive e-mails from the message identification and filtering system 445 and from the mailbox system 455, and return or "bounce" the e-mails back to the bulk mail sender system 410. E-mails may be bounced back to the bulk mail sender system 410 when a temporary delivery failure or a permanent delivery failure occurs.

Temporary delivery failures may occur for a variety of different reasons. For example, a temporary delivery failure may occur when the network 430 fails to properly transmit the message from the bulk mail sender system 410 to the message identification and filtration system 445 (e.g., too many message packets were lost because of network or server congestion). A temporary delivery failure also may occur when the Domain Name System (DNS) information in the e-mail header is inaccurate (e.g., the address domain name in the "from" field does not exist). In these examples, because the delivery failure is temporary, the message identification and filtration system 445 or the mailbox system 455 forwards the e-mail to the bounce server 450 which, in turn, bounces the e-mail back to the bulk mail sender system 410. Temporary delivery failures are temporary in the sense that the e-mail may still be sent to the recipient upon resolving the network and/or domain name issues.

Permanent delivery failures are different than temporary delivery failures in that the recipient may not receive an e-mail regardless of any resolution of network or e-mail content related issues. Permanent delivery failures typically occur due to the inability of the recipient mailbox system 455 to store the e-mail. For example, the mailbox system 455 may not be able to find the recipient among those serviced by the mailbox system 455, or the mailbox of the recipient (i.e., the storage space allotted to the recipient) may be full and unable to accept more e-mails. The mailbox system 455 also may allow recipients to designate that certain e-mails from certain senders and/or containing certain content not be allowed to be delivered to their mailbox (e.g., parental controls may be set to prevent the deposit of pornographic e-mails). Thus, permanent delivery failures may occur due to spam filtering. The mailbox system 455 and the message identification and filtration system 445 may employ spam filtering that identifies spam and may bounce the e-mail back to the bulk mail sender system 410 if the e-mail is classified as spam.

The bounce server 450 typically appends an error message to the e-mail before sending the e-mail back to the bulk mail sender system 410. The error message may be, for example, a 300 or 400 series e-mail error message for temporary delivery failures and a 500 series e-mail error message for permanent delivery failures. The bounce server 450 may send the e-mail back to the bulk mail sender system 410 using, for example, an SMTP transaction. If the bulk mail sender system 410 is unable to accept the bounced back e-mail, the SMTP transaction is not completed, and the bounce server 450 discards the e-mail.

The bounce server 450 may be included in one or more of the computer systems 445 or 455 or may be a separate computer system including one or more general or special purpose computers able to receive e-mails from both the message identification and filtration system 445 and the mailbox system 455 and able to send the e-mails back to the bulk mail sender system 410. In one implementation, the computers are UNIX machines capable of communicating with the message identification and filtration system 445, the mailbox system 455, and the bulk mail sender system 410 using a file transfer protocol such as SMTP.

The mailbox system 455 receives and stores e-mails sent by the bulk mail sender 410 that are not bounced or deleted by the message identification and filtration system 445. The e-mails typically are segmented into constituent parts and stored in storage locations corresponding to the mailbox or mailboxes of the one or more recipients. A recipient system 420 may access e-mails stored in a mailbox by communicating directly with the mailbox system 455 using a mail retrieval protocol such as, for example, POP or IMAP.

The mailbox system 455 also may communicate with a complaints data store 457 in which complaints directed towards specific e-mails or e-mail senders are stored. The complaints may include, for example, electronic records of phoned-in complaints, complaints received through postal mail, and/or complaints received through e-mail. E-mail complaints may be generated in a manner similar to that disclosed in U.S. application Ser. No. 10/306,880, which was filed Nov. 27, 2002, is titled IDENTIFICATION AND FILTRATION OF DIGITAL COMMUNICATIONS, and is hereby incorporated by reference in its entirety.

The mailbox system 455 may treat preferentially e-mails from bulk mail senders complying with bulk mail policies by, for example, allowing the e-mails to bypass some or all of the spam filtering normally done by the mailbox system 455 and/or by placing the e-mails in a special sub storage location or folder associated with the mailbox of each recipient. The mailbox system 455 may determine which senders are complying with bulk mail policies by, for example, accessing the complaint data store 457, accessing a log data store 462 (discussed below), accessing a local lookup table, or communicating with another computer, server, or device to request the status of the bulk mail sender. The bulk mail sender may be identified by extracting from the e-mail header information the sender name, the domain name, and/or the IP address of the bulk mail sender.

The mailbox system 455 may be a computer system including one or more general or special purpose computers, devices, servers, or components capable of receiving, segmenting, and storing e-mails. In one implementation, the computers are UNIX machines that communicate with the message identification and filtration system 445 and the bounce server 450 using SMTP and communicate with the recipients systems 420 using POP or IMAP.

The computer log server 460 is configured to receive computer activity data (i.e., computer log data) from the message identification and filtration system 445, the bounce server 450, and/or the mailbox system 455. The message identification and filtration system 445 may, for example, provide data that includes the number and type of e-mails received (e.g., the number of e-mails received from a given sender name, domain name, or IP address and/or sent to a given recipient name, domain name, or IP address, and whether the e-mails received are spam, bulk mail, or ordinary mail), the header information or other portions of the content of those e-mails, the number of e-mails deleted, the number of e-mails sent to the bounce server 450, and the number of e-mails sent to the mailbox system 455. The bounce server 450 may provide data that includes the number and type of e-mails bounced (e.g., the number of bounced e-mails due to temporary and permanent delivery failures), and the number of bounced e-mails successfully received by the bulk mail sender system 410. The mailbox system 455 may provide data relating to the segmentation and storage of the e-mails, the complaints received from recipients associated with the e-mails or e-mail senders, and the number of e-mails bounced due to spam filtering or due to mailbox storage restrictions. This computer activity data may be continuously or periodically received by the computer log server 460 from each of the systems 445, 450, and 455 through either a push or pull delivery mechanism.

In one implementation, the computer log server 460 is a UNIX machine that requests process activity data every thirty minutes from the systems 445, 450, and 455 using a general network communication protocol such as Transmission Control Protocol/Internet Protocol (TCP/IP). The UNIX machine may be programmed to request, process, and store system activity data every thirty minutes by adding entries to chronology tables (crontabs) of the machine to invoke data request scripts (i.e., lists of computer commands that may be executed without user interaction) every thirty minutes.

The computer log server 460 may process and store the computer activity data in a log data store 462. The processing may include segmentation of the data and/or statistical processing of the data to determine, for example, aggregate numbers, averages, moving averages, and other statistical figures of merit. The log data store 462 may index the data in a variety of different ways including by sender name, IP address, domain name, recipient name, date received, file size, and/or by any other portion of the content of received e-mails (e.g., header, body, or attachments). The data may be compressed prior to storage in the log data store 462. In one implementation, the log data store 462 is included in the computer log server 460. In another implementation, the log data store 462 is included in a computer or computer system accessible to the computer log server 460.

The compliance monitoring computer 465 monitors the compliance of bulk mail senders with bulk mail policies by accessing the information stored in the log data store 462 and in the complaint data store 457. The compliance monitoring computer 465 may create and periodically update sender compliance data records that include information related to the compliance of at least each registered or otherwise identified bulk mail sender with bulk mail policies. The compliance monitoring computer 465 also may generate and send to a bulk mail sender a sender compliance report that describes the compliance of the bulk mail sender with bulk mail policies over a specified interval of time.

The compliance monitoring computer 465 may create and periodically update a sender compliance data record for each bulk mail sender. The sender compliance data record for each bulk mail sender may be stored in a data store in any of the message identification and filtration system 445, the mailbox system 455, the complaint data store 457, the log data store 462, the computer log server 460, the compliance monitoring computer 465, and/or any data store accessible to the compliance monitoring computer 465 and to the systems 445, 455, and 420. The message identification and filtration system 445, the mailbox system 455, and/or the recipient systems 420 may access the sender compliance data records to determine whether an e-mail sent by a bulk mail sender should be preferentially treated.

A sender compliance data record may include a compliance flag and may identify the bulk mail sender, for instance, by the sender name, the domain name, the IP address of the bulk mail sender, and/or any other identifier. The compliance flag may be used to track bulk mail sender compliance with bulk mail policies. For example, the compliance monitoring computer 465 may automatically turn ON the compliance flag when the bulk mail sender is complying with specified bulk mail policies and turn OFF the compliance flag when the bulk mail sender is not in compliance. Alternatively or additionally, a user of the compliance monitoring computer 465 or a system operator of the host mail system 440 may manually access and turn ON and OFF the compliance flag of a sender compliance data record corresponding to a given bulk mail sender. The user or system operator may manually turn ON and OFF the compliance flag based on, for example, the sender compliance reports, the data stored in the complaint data store 457, the data stored in the computer log store 462, and/or any other data directed to the compliance of the given bulk mail sender with bulk mail policies.

A sender compliance data record may track multiple levels or tiers of compliance through the use of multiple compliance flags. The multiple compliance flags may be turned ON or OFF automatically or manually in the same manner as disclosed above based on the extent of compliance of the bulk mail sender with specified bulk mail policies. For example, a flag may correspond to excellent compliance if the bulk mail sender always complies with all policies, and another flag may correspond to good compliance if the bulk mail sender usually complies with all policies. Excellent compliance may result in better preferential treatment by the systems 445, 455, and/or 420 than good compliance.

The compliance monitoring computer 465 may generate and send sender compliance reports to bulk mail senders at periodic intervals and/or upon occurrence of triggering events. The sender compliance reports serve to keep the bulk mail sender informed of its current level of compliance or noncompliance with bulk mail policies. The triggering events may include the bulk mail sender not complying with one or more policies (e.g., receiving a number of complaints from recipients regarding the behavior of the bulk mail sender), and/or the bulk mail sender egregiously not complying with other policies (e.g., rejecting every e-mail that is bounced back by the host mail system 440). The sender compliance reports may be sent manually to the bulk mail senders using, for example, postal mail, or they may be sent automatically to the bulk mail senders using, for example, e-mail.

A sender compliance report may include a breakdown or list of the policies that the bulk mail sender is following and/or not following. The sender compliance reports also may include one or all of the recipient complaints received by the host mail system 440 over a given time interval and directed to the bulk mail sender in general or directed to specific e-mails sent by the bulk mail sender in particular.

In one implementation, the compliance monitoring computer 465 is a UNIX machine that monitors bulk mail sender compliance and generates and sends a sender compliance report every twenty four hours. Specifically, the UNIX machine retrieves data related to identified bulk mail senders from the log data store 462 and the complaint data store 457, processes the data to verify sender compliance with specified bulk mail policies, and generates and sends sender compliance reports to each bulk mail sender that exhibits behavior that surpasses a predetermined threshold of noncompliance. The UNIX machine may be programmed to retrieve data, process the data, and generate and send sender compliance reports periodically (e.g., every twenty four hours) or otherwise by adding entries to the chronology tables (crontabs) of the machine to invoke report generation scripts at a specified periodic interval (e.g., every twenty four hour interval). A user of the UNIX machine may access and modify compliance data records based on the generated reports. Alternatively, the report generation scripts may be programmed to both generate reports and automatically modify sender compliance data records every twenty four hours.

A set of exemplary bulk mail policies is shown in Table 1. In the Table 1 example, the main goals of the depicted bulk mail policies include ensuring that the bulk mail sender system 410 is secure (e.g., not open to third party senders), is located at a "fixed point" in IP-space (i.e., its IP address or addresses do not vary over time), and does not overload the host mail system 440. The bulk mail policies may be divided, for example, into three types of policies: (1) e-mail relay configuration policies, (2) e-mail formatting policies, and (3) general procedural policies.

TABLE 1

E-mail Relay Configuration Policies

E-mails must be Request for Comments (RFC) compliant
E-mail servers or relays must have valid reverse DNS lookups
E-mail servers or relays must be closed to third party relaying
No use of dynamically assigned IP addresses
No hardcoding of the mx records of the host mail system
Immediate unsubscription of e-mail addresses that receive a permanent delivery failure
More than 10% of the e-mails sent by the bulk mail sender system must not be bounced TABLE 1-continued Bulk mail sender system must accept more than 90% of bounced e-mails E-mail Formatting Policies No hiding or forging sender-related information
E-mails must state how and when the address of the recipient was obtained and whether the e-mail is a one-time mailing or a recurring mailing
E-mails must include valid instructions on how to unsubscribe the recipient e-mail address
E-mails must include a valid non-Internet contact General Procedural Policies E-mails must be solicited
Bulk mail sender must accept and respond to daily compliance reports if noncompliance is reported
Bulk mail sender must not receive a significant number of recipient complaints per million e-mails sent The e-mail relay configuration policies relate to the manner in which the bulk mail sender system 410 relays or transmits e-mails. The e-mail relay configuration policies may include a requirement that the e-mails sent by the bulk mail sender be request for comments (RFC) compliant (i.e., request for comments by the Network Working Group). RFC compliance may include the e-mail complying with the e-mail delivery and format guidelines set forth in RFC 821 and 822. If the e-mail has an embedded universal resource locator (URL) link, the e-mail also may be required to comply with RFC 1738. The RFC compliance requirement ensures that the e-mails are configured in a manner that is consistent and compatible with the host mail system 440. RFC compliance may be monitored by the message identification and filtration system 445. Bulk mail sender e-mails that are not RFC compliant may be either deleted or bounced back to the bulk mail sender system 410 through the bounce server 450.

The e-mail relay configuration policies also may require that the intermediate e-mail relay 418 allow reverse DNS lookups. Reverse DNS lookups permit the host mail system 440 to identify the domain name that corresponds to the IP address of the intermediate e-mail relay 418. This linking of IP address to domain name helps decrease the anonymity of the e-mails sent by the bulk mail sender system 410. The message identification and filtration system 445 may do a reverse DNS lookup each time an e-mail is received from the intermediate e-mail relay 418 of the bulk mail sender system 410. The message identification and filtration system 445 may either delete or bounce back any e-mails sent from intermediate e-mail relays 418 that do not have valid reverse DNS lookups.

The e-mail relay configuration policies also may require that the intermediate e-mail relay 418 be closed to third party relaying. By verifying that the intermediate e-mail relay 418 is closed to third party relaying, the host mail system 440 may prevent anonymous third parties from masking their e-mails by sending them through the intermediate e-mail relay 418. Verification that the intermediate e-mail relay 418 of a bulk mail sender system 410 is not allowing third party relaying may be accomplished by performing an "open relay" or "open proxy" test. The compliance monitoring computer 465 may perform these tests at certain intervals of time (e.g., weekly) automatically through the use of scripts. For example, a script may attempt to send an e-mail to the IP address of an intermediate e-mail relay 418. The e-mail is addressed back to the e-mail account used by the compliance monitoring computer 465. If the e-mail is successfully received by the compliance monitoring computer 465 through the intermediate e-mail relay 418, then the intermediate e-mail relay 418 is deemed open to third party relaying.

If the e-mail is bounced back to the compliance monitoring computer 465 with an error or not received at all by the compliance monitoring computer 465, then the intermediate e-mail relay 418 is closed to third party relaying. Alternatively or additionally, a system operator or user may manually perform "open relay" or "open proxy" tests.

The e-mail relay configuration policies also may require that e-mails sent from the bulk mail sender system 410 not be sent from dynamically-assigned IP addresses. Dynamically-assigned IP addresses are IP addresses that typically are assigned to a sender when the sender logs into an ISP account using a dial-up connection. Dynamically-assigned IP addresses are inherently more anonymous and less secure than static IP addresses. The message identification and filtration system 445 may ensure that the IP address from which a given bulk mail sender e-mail is sent is not a dynamic IP address by comparing the IP address of the bulk mail sender e-mail with known ranges of IP addresses assigned to dynamic IP addresses.

The e-mail relay configuration policies also may require that the intermediate e-mail relay 418 not hardcode the mail exchange (mx) records of the host mail system 440. In order to optimize e-mail traffic load balancing among the various servers in the host mail system 440, the system operators of the host mail system 440 may change periodically the mx records corresponding to the host mail system 440. By hardcoding the mx records, however, the bulk mail sender system 410 ignores these load balancing changes and may, therefore, send e-mails to servers that are already overloaded, thereby exacerbating server overload problems. Determining when a given bulk mail sender system 410 has hardcoded the mx records of the host mail system 440 may be accomplished by monitoring the e-mail traffic loading of the mail servers in the message identification and filtration system 445. Loading that significantly diverges from that expected due to the modified mx records may be further analyzed to identify any bulk mail sender systems 410 that are contributing to the unexpected loading. Bulk mail sender systems 410 that are contributing to the unexpected loading typically have hardcoded the mx records of the host mail system 440.

The e-mail relay configuration policies also may require that bulk mail senders remove any e-mail address from their list of potential recipients if an e-mail sent to that e-mail address is bounced back due to a permanent delivery failure. This policy forces bulk mail senders to keep their lists up-to-date, thereby helping to prevent the host mail system 440 from needlessly processing invalid or unwanted e-mails. Determining when a given bulk mail sender system 410 is not complying with the policy requiring e-mail address list removal upon receipt of a permanent delivery failure bounce may be accomplished by monitoring the bounce patterns of e-mails sent by the bulk mail sender system 410. The bounce patterns may be calculated by processing the bounce data stored in the log data store 462. Bounce patterns may show noncompliance by, for example, indicating repeated bounces to the same e-mail addresses over a short duration.

The e-mail relay configuration policies also may require that not more than a specific threshold or amount, for example 10%, of the e-mails sent by the bulk mail sender system 410 to the host mail system 440 be bounced back to the bulk mail sender system 410. This policy forces bulk mail senders to keep their lists up-to-date, thereby helping to prevent the host mail system 440 from needlessly processing invalid or unwanted e-mails. The compliance monitoring computer 465 may monitor compliance with this policy automatically by, for example, periodically running scripts that access the log data store 462 to retrieve the total number of e-mails sent and the total number of e-mails bounced for each bulk mail sender system 410. Alternatively, compliance may be monitored by a user or system operator that manually accesses the data from the log data store 462.

The e-mail relay configuration policies also may require that the bulk mail sender system 410 accept more than a specific threshold or amount, for example 90%, of the bounced e-mails sent by the bounce server 450 to the bulk mail sender system 410. This policy forces the bulk mail sender system 410 to allot capacity to accept and handle bounced e-mails, thereby helping to prevent the bounce server 450 from needlessly processing unsuccessfully bounced e-mails. Unsuccessfully bounced e-mails may be tracked by the bounce server 450 by, for example, keeping records of each e-mail bounce SMTP transaction with each bulk mail sender system 410. If an e-mail bounce SMTP transaction is not successfully completed, the bounce server 450 generates a record of the unsuccessful e-mail bounce SMTP transaction and periodically sends this record (along with other computer log data) to the computer log server 460 for storage in the log data store 462. The compliance monitoring computer 465 may automatically monitor compliance with this policy by, for example, periodically running scripts that access the log data store 462 to retrieve the total number of bounced e-mails and the total number of unsuccessful e-mail bounce SMTP transactions for each bulk mail sender system 410. Alternatively, compliance may be monitored by a user or system operator that manually accesses the data from the log data store 462.

The e-mail formatting policies may be directed to controlling the contents of the e-mails sent by the bulk mail sender. The e-mail formatting policies increase the accountability of the bulk mail sender and prevent the bulk mail sender from including in the e-mails information that may mislead or deceive recipients.

The e-mail formatting policies may require that the bulk mail sender not hide or forge information related to the sender or sending site of the e-mail. For example, the e-mail "from" address, return path, time stamp, or any other header-related information may be required to be accurate, complete, and/or not misleading.

The e-mail formatting policies also may require that the bulk mail sender state how and when the e-mail address of the recipient was obtained and whether the e-mail is a one-time mailing or a recurring mailing. For example, an e-mail may state "Your e-mail address was obtained from Common-Travel.com on Aug. 2, 2002. You may receive future e-mails from us related to products that may be of interest to you."

The e-mail formatting policies also may require that the text of each e-mail sent by the bulk mail sender include valid instructions on how a recipient may remove his or her e-mail address from the mailing list of the bulk mail sender. The removal instructions may be required to be obvious, clear, and easily understood. The removal instructions may include, for example, a workable URL link to a one-click unsubscribe mechanism. Alternatively or additionally, the removal instructions may include instructions to "reply to" a valid e-mail address of the bulk mail sender.

The e-mail formatting policies also may require that the text of each e-mail include valid non-Internet contact information such as, for example, a postal mail address or a phone number. In some cases, the valid non-Internet contact information may be included in the e-mail by providing a workable URL link in the text of the e-mail that is directed to valid non-Internet contact information displayed on the web page of the bulk mail sender.

In general, monitoring bulk mail sender compliance with the e-mail formatting policies may be accomplished by monitoring and examining recipient complaints. When a recipient complains about an e-mail sent by a bulk mail sender, the system operators of the host mail system 440 may examine and identify any deceptive information in the e-mail. The message identification and filtration system 445 may then be programmed to proactively filter e-mails containing the deceptive information through string matching and/or content matching using file fingerprint comparison technologies such as, for example, digital signature technologies. Once a deceptive statement, invalid URL, or invalid non-Internet contact information is discovered, future e-mails containing such statements, links, or information may be proactively filtered by using, for example, a digital signature calculation, storage, search, and filtering process similar to that disclosed in U.S. application Ser. No. 10/306,880 for filtering e-mails based on recipient complaints.

The general procedural policies relate to the general process that must be followed by the bulk mail sender to obtain preferential status. The general procedural policies may require that the e-mails sent by the bulk mail sender be solicited. In other words, the bulk mail sender may be required to have a preexisting and provable relationship with the recipient before sending the recipient an e-mail. A preexisting relationship may include, for example, the recipient having visited a web-site associated with the bulk mail sender and having proactively signed up to receive information from the bulk mail sender. A preexisting relationship also may include the recipient voluntarily providing an e-mail address to an organization without placing restraints on the use of the e-mail address. The e-mail address then is purchased by the bulk mail sender from the organization and used by the bulk mail sender to send e-mails to the recipient.

The general procedural policies also may require that the bulk mail sender accept and respond to any sender compliance reports that indicate noncompliance with some or all of the bulk mail policies. The time to respond to the sender compliance reports may be limited to a specific period of time (e.g., must respond within a week). Repeated noncompliance with bulk mail policies may result in loss of preferential status.

The general procedural policies also may require that the e-mails sent by the bulk mail sender not generate more than a given threshold number of complaints from recipients. For example, the e-mail formatting policies may require that a bulk mail sender not receive more than 100 complaints per million messages sent. The number of complaints directed to a bulk mail sender may be accessed, for example, from the complaint data store 457 and the total number of e-mails sent by the bulk mail sender may be accessed from the log data store 462.

Figure 5A:
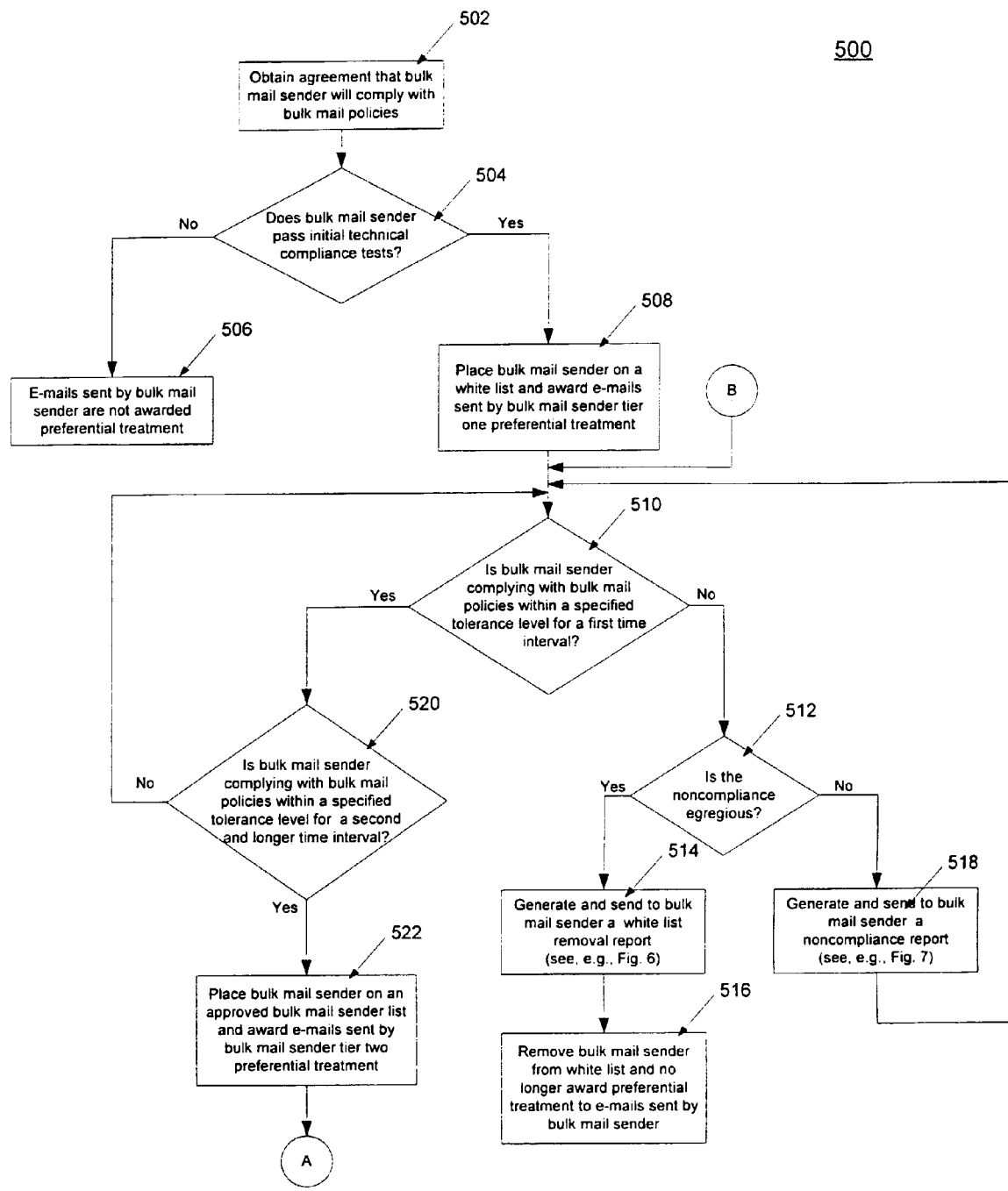
FIGS. 5A and 5B are a flowchart illustrating an exemplary process for approving a bulk mail sender for preferential treatment.
Figure 5B:
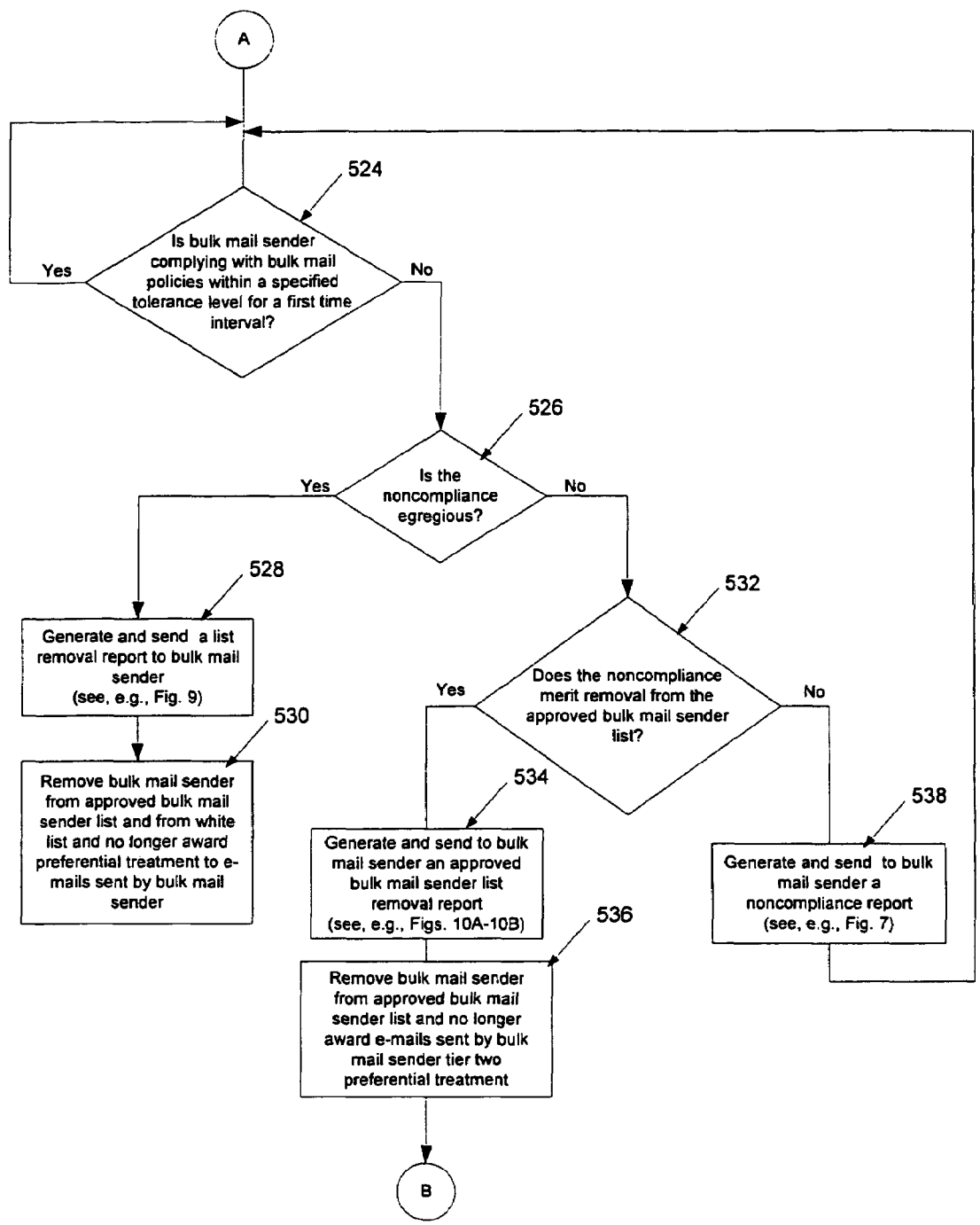

FIGS. 5A and 5B show an exemplary process 500 for approving a bulk mail sender for preferential treatment. The process 500 includes a two-tiered compliance test. Initial compliance with the bulk mail policies results in the bulk mail sender being placed on a "white list." Placement on the white list awards tier one preferential treatment to the e-mails sent by the bulk mail sender. Tier one preferential treatment may include, for example, allowing the e-mails to bypass e-mail content-related and e-mail sender-related message filtering carried out both by the message identification and filtration system 445 and by the mailbox system 455 (i.e., the spam filters are bypassed, but the mailbox filters set up by the recipient and the mailbox capacity filters are not bypassed).

Proven compliance with bulk mail policies over time results in the bulk mail sender being placed on an "approved bulk mail sender" list. Placement on the approved bulk mail sender list awards tier two preferential treatment to the e-mails sent by the bulk mail sender system 410. Tier two preferential treatment may include, for example, the preferential treatment of tier one and additionally may include the recipient system 420 displaying the e-mails to the recipient in a preferential manner (e.g., by placing an "approved bulk mail sender" icon next to each e-mail displayed in the inbox of the recipient).

Typically, the bulk mail sender approaches the system operators of the host mail system 440 to request preferential treatment. The request may be made manually through a telephone call or letter or it may be made electronically by, for example, filling out an application on a web-site. The bulk mail sender is subsequently presented with and agrees to comply with a list of bulk mail policies (502). Agreement may be achieved, for example, by signing or otherwise agreeing (e.g., by clicking through) to a legally binding contract.

The bulk mail sender system 410 undergoes a series of initial technical compliance tests (504). The initial technical compliance tests verify that the bulk mail sender system 410 is secure and technically able to comply with the bulk mail policies. For example, the initial technical compliance tests may include an "open relay" and an "open proxy" test to verify that the bulk mail sender system 410 is not open to third party relaying. The technical compliance tests also may include tests that verify that the DNS configuration of the bulk mail sender system 410 has a preferred configuration (e.g., allows reverse DNS lookups). If the bulk mail sender system 410 does not pass the initial technical compliance tests, the e-mails sent by the bulk mail sender is not awarded preferential treatment by the host mail system 440 or by the recipient system 420 (506).

However, if the bulk mail sender system 410 passes the initial technical compliance tests, the bulk mail sender is placed on a white list, and the e-mails sent by the bulk mail sender are awarded tier one preferential treatment (508). In one implementation, a system operator may create a sender compliance data record for the bulk mail sender upon the bulk mail sender agreeing to comply with the bulk mail policies. The sender compliance data record may include a white list compliance flag that is turned ON when the bulk mail sender system 410 passes the initial technical compliance tests. The sender compliance data record may be subsequently accessed by the message identification and filtration system 445 and/or the mailbox system 455 each time an e-mail is received from the bulk mail sender. If the white list compliance flag is turned ON, the message identification and filtration system 445 and/or the mailbox system 455 awards the e-mail tier one preferential treatment by, for example, allowing the e-mail to bypass e-mail content-related and e-mail sender-related message filtering.

Thereafter, the behavior of the bulk mail sender is monitored for a first time interval to assess whether the behavior complies with bulk mail policies in accordance with a specified tolerance level (510). In one implementation, the first time interval is 24 hours, and the compliance data collected from the log data store 462 and the complaint data store 457 by the complaint monitoring computer 465 includes: (1) the total number of e-mails sent by the bulk mail sender system 410, (2) the total number of e-mails bounced to the bulk mail sender system 410, (3) the total number of bounced e-mails successfully received by the bulk mail sender system 410, and (4) the total number of complaints generated in response to e-mails sent by the bulk mail sender. This compliance data may be collected for a twenty four hour period and then used to determine whether the bulk mail sender compliance falls within the specified tolerance level. For example, the bulk mail sender compliance may fall within an acceptable tolerance level if the bulk mail sender sends less than 8000 e-mails during the twenty four hour period OR if the bulk mail sender: (1) bounces less than 10% of the total e-mails sent (i.e., the total number of bounced e-mails divided by the total number of e-mails sent over the twenty four hour period must be less than 10%); (2) accepts more than 90% of the bounced e-mails (i.e., the total number of bounced e-mails successfully received by the bulk mail sender system 410 divided by the total number of bounced e-mails for the twenty four hour period must be greater than 90%); and (3) generates less than 100 complaints per million e-mails sent (i.e., the total number of complaints generated divided by the total number of e-mails sent in millions over the twenty four hour period must be less than 100). If the bulk mail sender sends more than 8000 e-mails and does not comply with one or more of the specified requirements over the twenty four hour period, the compliance of the bulk mail sender falls outside of the specified tolerance level.

If the compliance of the bulk mail sender falls outside of a specified tolerance level, the noncompliance of the bulk mail sender is further examined to assess whether the noncompliance is egregious (512). Egregious noncompliance may include, for example, surpassing the threshold of compliance by a factor of two or three (e.g., bounce 30% of e-mails, receive 300 complaints per million e-mails sent, accept only 30% of bounced e-mails) and/or repeated noncompliance over time (e.g., noncompliance for five twenty four hour periods in one month).

If the noncompliance of the bulk mail sender is egregious, the compliance monitoring computer 465 generates and sends to the bulk mail sender a white list removal report (514). The white list removal report is a sender compliance report that informs the bulk mail sender of the removal of the bulk mail sender from the white list due to egregious noncompliance. The white list removal report may include a breakdown of sender behavior data that shows the egregious noncompliance of the bulk mail sender with bulk mail policies. The sender behavior data may include processed compliance data collected from the complaint data store 457 and the log data store 462 by the compliance monitoring computer 465. The white list removal report may be sent electronically using, for example, e-mail or manually using, for example, postal mail or a telephone. Table 2 shows an example of a white list removal report.

TABLE 2

Dear BULK MAIL SENDER,
    You are receiving this message via our automated report generation processes, which audit HMS's Internet inbound mail flow, specifically:
    1) the number of bounces a sender's mailings generate (percent of invalid email addresses per 24 hour period),
    2) the percentage of bounces we return to the sender that the sending party's servers can accept,
    3) the number of complaints senders' mailings generate over the last 24 hours.
        You have broken one or more of the following thresholds and, therefore, are receiving this white list removal report:
    1) bounce more than 10% of your list
    2) take less than 90% of the bounces we wish to send back to you
    3) generate more than 100 complaints per million messages we receive from your servers.

TABLE 2-continued

HMS is contacting you because the bulk email that is being sent from BULK MAIL SENDER is causing problems with our day to day email operations. When sending email to HMS, we would advise that BULK MAIL SENDER adhere to our suggested bulk mail policies. BULK MAIL SENDER is being removed from our white list due to egregious noncompliance to our bulk mail policies. The bulk e-mail that is being sent from BULK MAIL SENDER is no longer being awarded preferential treatment.
  BULK MAIL SENDER is being removed from our white list due to behavior that has caused a significant negative impact on our system or member experience. BULK MAIL SENDER has significantly risen above current thresholds on 1 or more of the following issues:
Total percentage of messages bounced: 9%
Total Percentage of bounces accepted by BULK MAIL SENDER: 92%
Total number of HMS member complaints per million messages: 950
  Please contact us directly via email within the next 72 hours to advise HMS of BULK MAIL SENDER's intended plan of action for addressing these issues. An acceptable plan of action may place BULK MAIL SENDER back on our white list. If you do not respond. HMS reserves the right to take all necessary measures to protect the operations of its email system and prevent further HMS member complaints, up to and including suspending BULK MAIL SENDER's ability to transmit email to HMS members.
    If BULK MAIL SENDER is receiving this email because of high HMS member complaints. please respond to this email with an abuse email address where HMS can forward the complaints for further action.
Thank you for your time,
HMS's Postmaster Staff Concurrent, subsequent, or prior to generating and sending the white list removal report, the compliance monitoring computer 465 removes the bulk mail sender from the white list, thereby resulting in e-mails sent by the bulk mail sender no longer being awarded tier one preferential treatment (516). In one implementation, the compliance monitoring computer 465 may automatically turn OFF the white list compliance flag in the sender compliance data record corresponding to the bulk mail sender upon detection of egregious noncompliance. In some implementations, the bulk mail sender may be given an opportunity to address egregious noncompliance issues prior to white list removal.

If the noncompliance of the bulk mail sender is not egregious (e.g., bounces 12% of the total e-mails sent or rarely exhibits noncompliance), the compliance monitoring computer 465 generates and sends to the bulk mail sender a noncompliance report (518). The noncompliance report is a sender compliance report that informs the bulk mail sender of its noncompliance with bulk mail policies. The noncompliance report may include a list of the bulk mail policies that currently are being violated and may request a corrective action plan from the bulk mail sender. Despite the noncompliance, the e-mails sent by the bulk mail sender still are awarded tier one preferential treatment. The behavior of the bulk mail sender continues to be monitored for the next first time interval (i.e., the process 500 returns to operation 510). Table 3 shows an example of a noncompliance report.

TABLE 3

Dear BULK MAIL SENDER,
  You are receiving this message via our automated report generation processes, which audit HMS's Internet inbound mail flow, specifically:
  4) the number of bounces a sender's mailings generate (percent of invalid email addresses per 24 hour period),
  5) the percentage of bounces we return to the sender that the sending party's servers can accept,
  6) the number of complaints senders' mailings generate over the last 24 hours.
    You have broken one or more of the following thresholds and, therefore, are receiving this noncompliance report:
  4) bounce more than 10% of your list
  5) take less than 90% of the bounces we wish to send back to you
  6) generate more than 100 complaints per million messages we receive from your servers.
  HMS is contacting you because the bulk email that is being sent from BULK MAIL SENDER is causing problems with our day to day email operations. When sending email to HMS, we would advise that BULK MAIL SENDER adhere to our suggested bulk mail policies. BULK MAIL SENDER is currently on our white list, and the bulk e-mail that is being sent from BULK MAIL SENDER is being awarded preferential treatment. Continued noncompliance may remove BULK MAIL SENDER from our white list and eliminate any bulk e-mail preferential treatment.
    BULK MAIL SENDER has risen above current thresholds on 1 or more of the following issues:
Total percentage of messages bounced: 16%
Total percentage of bounces accepted by BULK MAIL SENDER: 92%
Total number of HMS member complaints per million messages: 35
  Please contact us directly via email within the next 72 hours to advise HMS of BULK MAIL SENDER's intended plan of action for addressing these issues. If you do not respond. HMS reserves the right to take all necessary measures to protect the operations of its email system and prevent further HMS member complaints. up to and including suspending BULK MAIL SENDER's ability to transmit email to HMS members.
    If BULK MAIL SENDER is receiving this email because of high HMS member complaints, please respond to this email with an abuse email address where HMS can forward the complaints for further action.
Thank you for your time.
HMS's Postmaster Staff If the bulk mail sender is behaving in compliance with the bulk mail policies for the first time interval, the monitoring computer 465 determines whether the bulk mail sender has been complying with bulk mail policies for a second and longer time interval (520). The second and longer time interval may be equal to an integer number of first time intervals. For example, if the first time interval is a day, then the second time interval may be a month.

If the bulk mail sender has not been complying with bulk mail policies for the second time interval (e.g., bulk mail sender has been in compliance for a day but not for a month), then the behavior of the bulk mail sender continues to be monitored for the next first time interval (i.e., the process 500 returns to operation 510).

If, however, the bulk mail sender has been complying with the bulk mail policies for the second time interval, then the bulk mail sender is placed on an approved bulk mail sender list, and the e-mails sent by the bulk mail sender are awarded tier two preferential treatment (522). In one implementation, the compliance monitoring computer 465 may place a bulk mail sender onto the approved bulk mail sender list by turning ON an approved bulk mail sender compliance flag in the sender compliance data record of the bulk mail sender. The message identification and filtration system 445 may designate e-mails sent by the approved bulk mail sender as approved e-mails by, for example, turning ON a bulk mail flag bit in the header of each e-mail sent by the approved bulk mail sender. The recipient systems 420 then may provide tier two preferential treatment to these approved e-mails by placing, for example, an "approved bulk mail sender" icon next to a display of information related to each e-mail designated as an approved e-mail. The recipient systems 420 may identify an approved e-mail by, for example, examining the bulk mail flag bit in the header of the e-mail.

Figure 6:
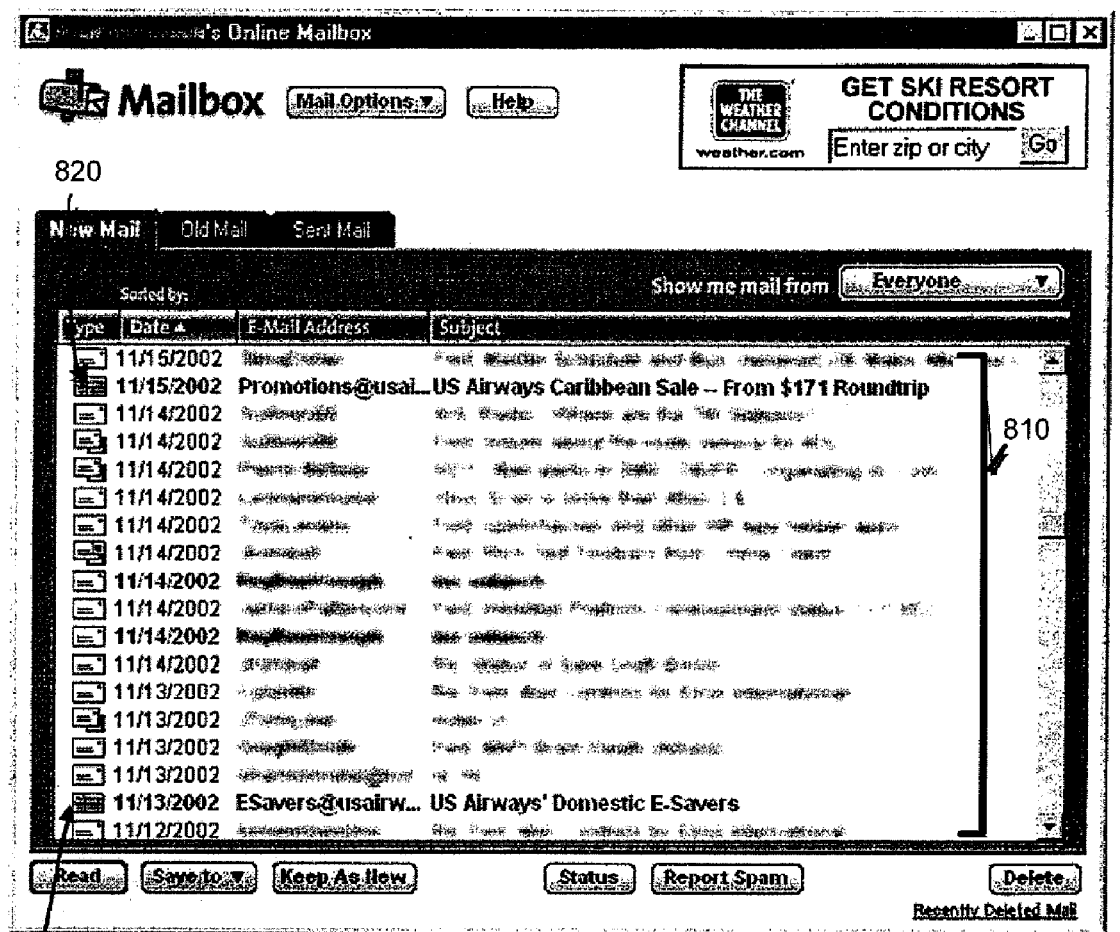
FIG. 6 is an exemplary user interface.
Figure 7:
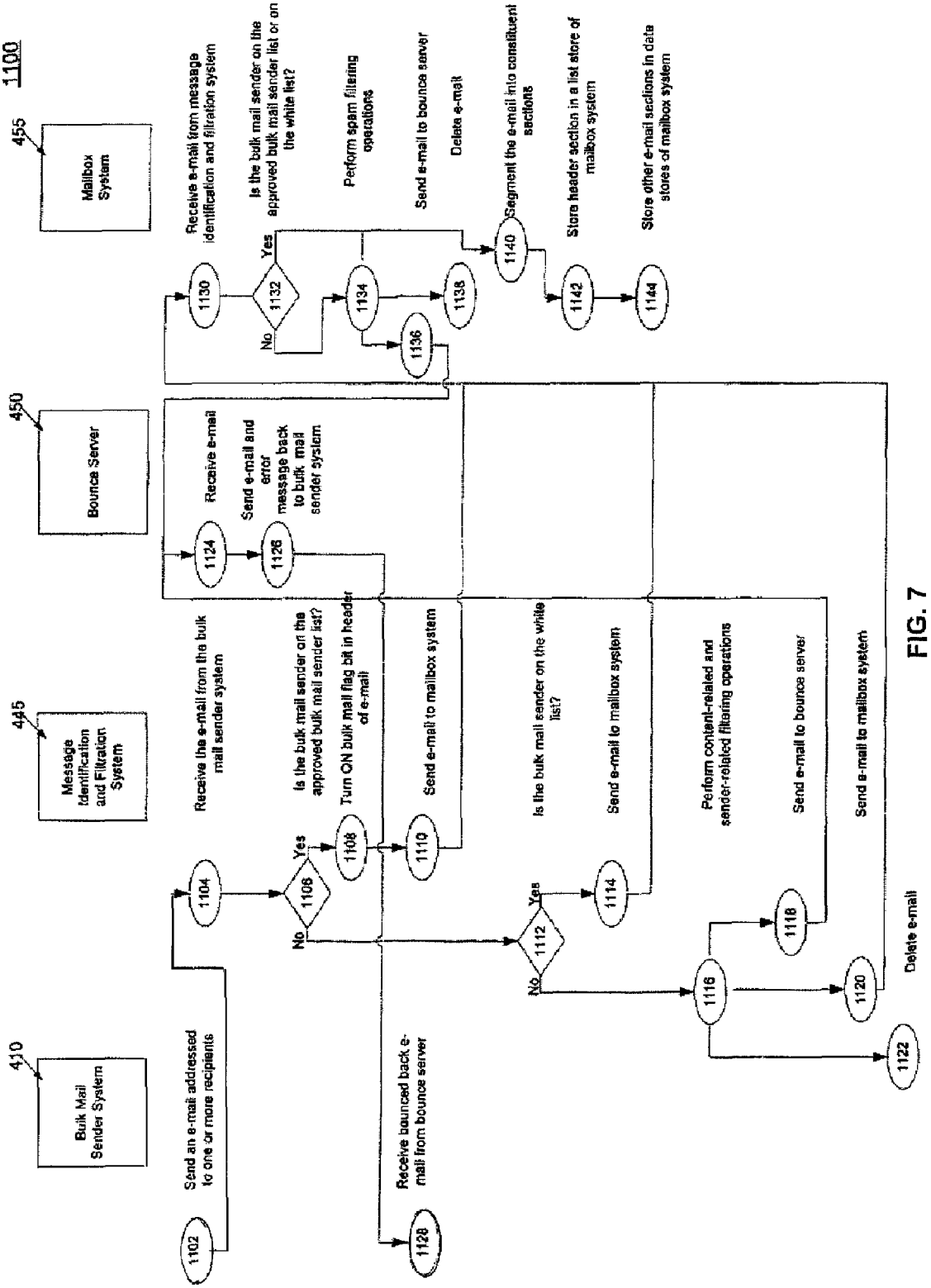
FIG. 7 is a flowchart illustrating an exemplary process used by the e-mail system of FIG. 4 to preferentially treat an e-mail sent by a bulk mail sender complying with bulk mail policies.

FIG. 6 shows an exemplary e-mail user interface 800 showing a list 810 of the header information of e-mails received by a recipient. Approved e-mails are set apart through the use of an "approved bulk mail sender" icon 820 displayed next to the corresponding e-mail header information. In addition or as an alternative, other techniques may be used to distinguish communications (e-mails in this implementation) from compliant bulk mail senders, visually or otherwise.

In some implementations, the bulk mail sender may be placed on the approved bulk mail sender list if the bulk mail sender has only received a small number of noncompliance reports. For example, if the first time interval is a day and the second time interval is a month, the bulk mail sender may still be placed on the approved bulk mail sender list if the bulk mail sender has received only one noncompliance report in a given month.

The behavior of a bulk mail sender that has been placed onto the approved bulk mail sender list may be monitored regularly every first time interval to assess whether the behavior continues to comply with bulk mail policies to within a specified tolerance level (524). If the compliance of the approved bulk mail sender falls outside of a specified tolerance level, the noncompliance of the approved bulk mail sender may be further examined to assess whether the noncompliance is egregious (526).

If the noncompliance is egregious, the compliance monitoring computer 465 may generate and send to the bulk mail sender a list removal report (528). The list removal report is a sender compliance report that informs the bulk mail sender of the removal of the bulk mail sender from both the approved bulk mail sender list and the white list due to egregious noncompliance. The list removal report may include a breakdown of sender behavior data that shows the egregious noncompliance of the bulk mail sender with bulk mail policies. The sender behavior data may include processed compliance data collected from the complaint data store 457 and the log data store 462 by the compliance monitoring computer 465. The list removal report may be sent electronically using, for example, e-mail or manually using, for example, postal mail or a telephone. Table 4 shows an example of a list removal report.

TABLE 4

Dear BULK MAIL SENDER,
    You are receiving this message via our automated report generation processes, which audit HMS's Internet inbound mail flow. specifically:
    7) the number of bounces a sender's mailings generate (percent of invalid email addresses per 24 hour period),
    8) the percentage of bounces we return to the sender that the sending party's servers can accept,
    9) the number of complaints senders' mailings generate over the last 24 hours.
    You have broken one or more of the following thresholds and, therefore, are receiving this list removal report:
    7) bounce more than 10% of your list
    8) take less than 90% of the bounces we wish to send back to you
    9) generate more than 100 complaints per million messages we receive from your servers.
    HMS is contacting you because the bulk email that is being sent from BULK MAIL SENDER is causing problems with our day to day email operations. When sending email to HMS, we would advise that BULK MAIL SENDER adhere to our suggested bulk mail policies. BULK MAIL SENDER is being removed from our white list and our approved bulk mail sender list due to egregious noncompliance to our bulk mail policies. The bulk e-mail that is being sent from BULK MAIL SENDER is no longer being awarded preferential treatment.
    BULK MAIL SENDER is being removed from our white list and from our approved bulk mail sender list due to behavior that has caused a significant negative impact on our system or member experience. BULK MAIL SENDER has significantly risen above current thresholds on 1 or more of the following issues:
Total percentage of messages bounced: 5%
Total percentage of bounces accepted by BULK MAIL SENDER: 95%
Total number of HMS member complaints per million messages: 2451
    Please contact us directly via email within the next 72 hours to advise HMS of BULK MAIL SENDER's intended plan of action for addressing these issues. An acceptable plan of action may place BULK MAIL SENDER back on our white list. If you do not respond, HMS reserves the right to take all necessary measures to protect the operations of its email system and prevent further HMS member complaints, up to and including suspending BULK MAIL SENDER's ability to transmit email to HMS members.
    If BULK MAIL SENDER is receiving this email because of high HMS member complaints, please respond to this email with an abuse email address where HMS can forward the complaints for further action.
Thank you for your time,
HMS's Postmaster Staff Concurrent, subsequent, or prior to generating and sending the list removal report, the compliance monitoring computer 465 removes the bulk mail sender from both the approved bulk mail sender list and the white list, thereby resulting in e-mails sent by the bulk mail sender no longer being awarded preferential treatment (i.e., no longer being awarded tier one or tier two preferential treatment) (530). In one implementation, the monitoring computer 465 may detect egregious noncompliance by a bulk mail sender and may automatically turn OFF both the approved bulk mail sender compliance flag and the white list compliance flag in the sender compliance data record corresponding to that bulk mail sender. In some implementations, the bulk mail sender may be given an opportunity to address egregious noncompliance issues prior to removal from the approved bulk mail sender list and from the white list.

If the noncompliance of the approved bulk mail sender is not egregious, then the compliance monitoring computer 465 may assess whether the noncompliance of the bulk mail sender nevertheless merits removal from the approved bulk mail sender list (532). For example, if the first time interval is one day and the second time interval is one month, three or more days of noncompliance in a given month may merit removing the bulk mail sender from the approved bulk mail sender list, despite such behavior not rising to the level of egregious noncompliance.

If the noncompliance of the approved bulk mail sender merits removal from the approved bulk mail sender list, the compliance monitoring computer 465 generates and sends to the approved bulk mail sender an approved bulk mail sender list removal report (534). The approved bulk mail sender list removal report is a sender compliance report that informs the bulk mail sender of the removal of the bulk mail sender from the approved bulk mail sender list due to noncompliance. The approved bulk mail sender list removal report may include a breakdown of sender behavior data that shows the noncompliance of the bulk mail sender to bulk mail policies. The sender behavior data may include processed compliance data collected from the complaint data store 457 and the log data store 462 by the compliance monitoring computer 465. The approved bulk mail sender list removal report may be sent electronically using, for example, e-mail or manually using, for example, snailmail or a telephone. Table 5 shows an example of an approved bulk mail sender list removal report.

TABLE 5

Dear BULK MAIL SENDER,
You are receiving this message via our automated report generation processes, which audit HMS's Internet inbound mail flow, specifically:
10) the number of bounces a sender's mailings generate (percent of invalid email addresses per 24 hour period),
11) the percentage of bounces we return to the sender that the sending party's servers can accept,
12) the number of complaints senders' mailings generate over the last 24 hours.
You have broken one or more of the following thresholds during each of three or more days during the past month and, therefore, are receiving this approved bulk mail sender list removal report:
10) bounce more than 10% of your list
11) take less than 90% of the bounces we wish to send back to you
12) generate more than 100 complaints per million messages we receive from your servers.
HMS is contacting you because the bulk email that is being sent from BULK MAIL SENDER is causing problems with our day to day email operations. When sending email to HMS, we would advise that BULK MAIL SENDER adhere to our suggested bulk mail policies. BULK MAIL SENDER is being removed from our approved bulk mail sender list due to noncompliance to our bulk mail policies. The bulk e-mail that is being sent from BULK MAIL SENDER is no longer being awarded the highest preferential treatment. BULK MAIL SENDER remains on our white list, and the bulk e-mail that is being sent from bulk mail sender is still being awarded preferential treatment. Continued noncompliance may remove BULK MAIL SENDER from our white list and eliminate any bulk e-mail preferential treatment.
BULK MAIL SENDER is being removed from our approved bulk mail sender list due to behavior that has repeatedly not complied to our bulk mail policies over the past month BULK MAIL SENDER has significantly risen above current thresholds on 1 or more of the following issues during the following days:
11/19/02
Total percentage of messages bounced: 16%
Total percentage of bounces accepted by BULK MAIL SENDER: 92%
Total number of HMS member complaints per million messages: 85
11/10/02
Total percentage of messages bounced: 9%
Total percentage of bounces accepted by BULK MAIL SENDER: 52%
Total number of HMS member complaints per million messages: 32
11/2/02
Total percentage of messages bounced: 12%
Total percentage of bounces accepted by BULK MAIL SENDER: 89%
Total number of HMS member complaints per million messages: 120
Please contact us directly via email within the next 72 hours to advise HMS of BULK MAIL SENDER's intended plan of action for addressing these issues. An acceptable plan of action may place BULK MAIL SENDER back on our approved bulk mail sender list. If you do not respond, HMS reserves the right to take all necessary measures to protect the operations of its email system and prevent further HMS member complaints, up to and including suspending BULK MAIL SENDER's ability to transmit email to HMS members.
If BULK MAIL SENDER is receiving this email because of high HMS member complaints, please respond to this email with an abuse email address where HMS can forward the complaints for further action.
Thank you for your time, HMS Postmaster Staff Concurrent, subsequent, or prior to generating and sending the approved bulk mail sender list removal report, the compliance monitoring computer 465 removes the bulk mail sender from the approved bulk mail sender list, thereby resulting in e-mails sent by the bulk mail sender no longer being awarded tier two preferential treatment (536). In one implementation, the compliance monitoring computer 465 may automatically turn OFF the approved bulk mail sender list compliance flag in the sender compliance data record corresponding to the bulk mail sender upon detection of noncompliance. In some implementations, the bulk mail sender may be given an opportunity to address noncompliance issues prior to removal from the approved bulk mail sender list.

If the noncompliance of the bulk mail sender does not merit removal from the approved bulk mail sender list, the compliance monitoring computer 465 generates and sends to the bulk mail sender a noncompliance report (538). The noncompliance report may be a sender compliance report analogous to that discussed with respect to operation 518. Despite the noncompliance, the e-mails sent by the bulk mail sender are still awarded tier two preferential treatment. The behavior of the bulk mail sender continues to be monitored for the next first time interval (i.e., the process 500 returns to operation 524).

FIG. 17 shows an example of a process 1100 that may be used by the e-mail system 400 to preferentially treat an e-mail sent by a bulk mail sender complying with bulk mail policies. The process 1100 assumes that two tiers of preferential treatment are available. Specifically, an e-mail sent by a bulk mail sender receives tier one preferential treatment if the bulk mail sender is included on a white list. An e-mail sent by a bulk mail sender receives tier two preferential treatment if the bulk mail sender is included on an approved bulk mail sender list. Tier one preferential treatment allows the e-mail to bypass e-mail content-related and e-mail sender-related message filtering carried out by both the message identification and filtration system 445 and the mailbox system 455. Tier two preferential treatment allows the e-mail to bypass the e-mail content-related and e-mail sender-related message filtering, as before, but also displays the e-mail to the user of the recipient system 420 in a preferential manner.

The bulk mail sender system 410 sends an e-mail addressed to one or more recipients to the message identification and filtration system 445 of the host mail system 440 (1102). The message identification and filtration system 445 receives the email (1104) and determines whether the received e-mail was sent by a bulk mail sender on the approved bulk mail sender list (1106). In one implementation, the system 445 may determine if the received e-mail was sent by a bulk mail sender included on the approved bulk mail sender list by extracting the identity (e.g., sender name, domain name, or IP address) of the bulk mail sender from the header information of the received e-mail. The system 445 may then access a sender compliance data record that corresponds to that sender identity and may examine an approved bulk mail sender compliance flag included in the sender compliance data record. If the approved bulk mail sender compliance flag in the sender compliance data record is set to ON, then the bulk mail sender is included on the approved bulk mail sender list. If, however, the approved bulk mail sender compliance flag is set to OFF, then the bulk mail sender is not included on the approved bulk mail sender list.

If the bulk mail sender is included on the approved bulk mail sender list, the message identification and filtration system 445 turns ON a bulk mail flag bit in the header of the e-mail (1108). The e-mail then is sent directly to the mailbox system 455 (1110).

If the bulk mail sender is not included on the approved bulk mail sender list, the message identification and filtration system 445 determines whether the received e-mail was sent by a bulk mail sender included on the white list (1112). In one implementation, the system 445 may determine if the received e-mail was sent by a bulk mail sender included on the white list by extracting the identity (e.g., sender name, domain name, or IP address) of the bulk mail sender from the header information of the received e-mail. The system 445 may then access a sender compliance data record that corresponds to that sender identity and may examine a white list compliance flag included in the sender compliance data record. If the white list compliance flag in the sender compliance data record is set to ON, then the bulk mail sender is included on the white list. If, however, the approved bulk mail sender compliance flag is set to OFF, then the bulk mail sender is not included on the white list.

If the bulk mail sender is included on the white list, the e-mail is sent directly to the mailbox system 455 (1114). If, however, the bulk mail sender is not included on the white list, the e-mail is not awarded preferential treatment, and the message identification and filtration system 445 performs various content-related and sender-related filtering operations on the e-mail, including spam filtering (1116). The result of the filtering operations may result in the e-mail being sent to the bounce server (1118), the e-mail being sent to the mailbox system 455 (1120), or the e-mail being deleted (1122).

An e-mail sent to the bounce server 450 is received by the bounce server 450 (1124) and is sent back to the bulk mail sender system 410 in a bounce e-mail that includes the e-mail and an appropriate error message (1126). The bounced e-mail may or may not be successfully received by the bulk mail sender system 410 (1128).

An e-mail sent to the mailbox system 455 by the message identification and filtration system 445 is received by the mailbox system 455 (1130) and the mailbox system 455 determines whether the e-mail was sent by a bulk mail sender included on either the white list or the approved bulk mail sender list (1132). In one implementation, the mailbox system 455 determines whether the e-mail was sent by a bulk mail sender included on the white list or included on the approved bulk mail sender list by examining the white list compliance flag and the approved bulk mail sender compliance flag in the sender compliance data record corresponding to the bulk mail sender.

If the bulk mail sender is not included on either the white list or the approved bulk mail sender list, then the mailbox system 455 performs spam filtering operations (1134). The spam filtering operations may result in the e-mail being sent to the bounce server (1136), the e-mail being deleted (1138), or the e-mail being segmented into constituent sections including a header section (1140). For example, the constituent sections also may include a body section (i.e., the letter or e-mail message), an attachment section (i.e., files attached to the e-mail), and an embedded objects section (i.e., graphical objects embedded in the e-mail message). If the bulk mail sender is included on either the white list or the approved bulk mail sender list, then no spam filtering operations are performed and the e-mail is segmented into constituent sections including a header section (1140).

Once segmented, the header section is stored in a list store (not shown) in the mailbox system 455 (1142) corresponding to the mailbox or mailboxes of the e-mail recipient(s). The list store contains header information of received e-mails and may be accessed by the recipient system 420 to display, for example, the list 810 in the user interface 800. The other sections of the e-mail are stored in one or more data stores in the mailbox system 455 (1144).

The recipient system 420 may access the received e-mail by, for example, initiating a POP or IMAP session with the mailbox system 455. The recipient system then may retrieve and examine the bulk mail flag bit in the header of any e-mail received by the recipient to determine whether or not to preferentially store or display that e-mail. If the flag bit is set to ON, the recipient system 420 may preferentially treat the e-mail by, for example, altering the manner in which the e-mail is presented to the recipient (e.g., graphically distinguishing the bulk e-mails by, for example, including a specialized icon next to information related to e-mails) or the manner in which the e-mail is processed by the e-mail application of the recipient system 420 (e.g., bypass some or all of the spam filtering of the e-mail application and/or allow the recipient to organize or categorize the bulk e-mails as a separate group).

A number of implementations have been described. Nevertheless, it will be understood that various modifications may be made. For example, the controllers 114 and 124 may include a program, a piece of code, an instruction, a device, a computer, a computer system, or a combination thereof, for independently or collectively directing the respective devices 112 and 122 to interact and operate as described. The controllers 114 and 124 may be embodied permanently or temporarily in any type of machine, component, physical or virtual equipment, storage medium, or propagated signal capable of providing instructions to the devices 112 and 122. The host mail system 440 may provide the described functionality using a different configuration of hardware or software working in concert with one or more other systems, such as, for example, one or more LANs or WANs.

Accordingly, other implementations are within the scope of the following claims.

What is claimed is:

1. A method for distinctively treating electronic messages sent by bulk message senders, the method comprising:
   applying filtering, including white listing based on white list information, to inbound electronic messages;
   obtaining an agreement between a messaging service provider and a bulk message sender that the bulk message sender agrees to comply with a set of bulk message policies in exchange for distinctive treatment of electronic messages sent by the bulk message sender;
   receiving a first electronic message sent by the bulk message sender, the first electronic message being received subsequent to obtaining the agreement between the messaging service provider and the bulk message sender;
   accessing, from a data record, sender compliance information that is additional to the white list information and associated with the bulk message sender, the sender compliance information being determined by:
      electronically aggregating information associated with the sending, by the bulk message sender, of electronic messages sent prior to receiving the first electronic message,
      determining whether the bulk message sender is complying with the set of bulk message policies based on the electronically aggregated information associated with the sending, by the bulk message sender, of electronic messages sent prior to receiving the first electronic message, and
      determining the sender compliance information that is additional to the white list information and associated with the bulk message sender based on the determination of whether the bulk message sender is complying with the set of bulk message policies;
   determining whether to distinctively treat the first electronic message based on the agreement of the bulk message sender to comply with the set of bulk message policies in exchange for distinctive treatment of electronic messages sent by the bulk message sender and the accessed sender compliance information that is additional to the white list information and associated with the bulk message sender;
   distinctively treating the first electronic message in response to determining to distinctively treat the first electronic message; and
   rendering a display based on the distinctive treatment.

2. The method of claim 1 further comprising:
   providing a first level of treatment to electronic messages received from senders whose electronic messages do not receive distinctive treatment based on white list information or sender compliance information; and
   providing a second level of treatment to electronic messages received from senders whose electronic messages receive distinctive treatment based on white list information, but do not receive distinctive treatment based on sender compliance information, the second level of treatment being different than the first level of treatment,
   wherein distinctively treating the first electronic message includes providing a third level of treatment to the first electronic message, the third level of treatment being different than the first level of treatment and the second level of treatment.

3. The method of claim 2 wherein:
   providing the first level of treatment includes providing ordinary treatment to electronic messages received from senders whose electronic messages do not receive distinctive treatment based on white list information or sender compliance information;
   providing the second level of treatment includes providing a low level of preferential treatment to electronic messages received from senders whose electronic messages receive distinctive treatment based on white list information, but do not receive distinctive treatment based on sender compliance information; and
   providing the third level of treatment to the first electronic message includes providing a high level of preferential treatment to the first electronic message.

4. The method of claim 2 wherein:
   providing the first level of treatment includes applying spam filtering operations to electronic messages received from senders whose electronic messages do not receive distinctive treatment based on white list information or sender compliance information;
   providing the second level of treatment includes bypassing spam filtering operations for electronic messages received from senders whose electronic messages receive distinctive treatment based on white list information, but do not receive distinctive treatment based on sender compliance information; and
   providing the third level of treatment to the first electronic message includes bypassing spam filtering operations for the first electronic message and graphically distinguishing, in a user interface provided at a recipient system, the first electronic message from electronic messages received from senders whose electronic messages do not receive distinctive treatment based on sender compliance information.

5. The method of claim 4 wherein graphically distinguishing, in a user interface provided at a recipient system, the first electronic message from electronic messages received from senders whose electronic messages do not receive distinctive treatment based on sender compliance information includes placing an icon proximate to summary or title information for the first electronic message displayed in the user interface, the icon graphically distinguishing the first electronic message in the user interface from electronic messages in the user interface that are received from senders whose electronic messages do not receive distinctive treatment based on sender compliance information.

6. The method of claim 4 wherein graphically distinguishing, in a user interface provided at a recipient system, the first electronic message from electronic messages received from senders whose electronic messages do not receive distinctive treatment based on sender compliance information includes displaying text of the first electronic message in a distinct color that is different from a color of displayed text of electronic messages received from senders whose electronic messages do not receive distinctive treatment based on sender compliance information.

7. The method of claim 4 wherein graphically distinguishing, in a user interface provided at a recipient system, the first electronic message from electronic messages received from senders whose electronic messages do not receive distinctive treatment based on sender compliance information includes placing the first electronic message in a separate folder from electronic messages received from senders whose electronic messages do not receive distinctive treatment based on sender compliance information.

8. The method of claim 1 wherein:
determining whether the bulk message sender is complying with the set of bulk message policies includes determining whether the bulk message sender is complying with a set of bulk message policies relating to a format of electronic messages, and
electronically aggregating information associated with the sending, by the bulk message sender, of electronic messages includes electronically aggregating information associated with the format of electronic messages sent by the bulk message sender.

9. The method of claim 1 wherein:
determining whether the bulk message sender is complying with the set of bulk message policies includes determining whether the bulk message sender is complying with a set of bulk message policies relating to a method of sending electronic messages, and
electronically aggregating information associated with the sending, by the bulk message sender, of electronic messages includes electronically aggregating information associated with the method of sending electronic messages used by the bulk message sender.

10. The method of claim 1 wherein:
determining whether the bulk message sender is complying with the set of bulk message policies includes determining whether the bulk message sender is complying with a set of bulk message policies including a requirement that the bulk message sender not hide or forge sender-related information, and
electronically aggregating information associated with the sending, by the bulk message sender, of electronic messages includes electronically aggregating information associated with whether the bulk message sender has hidden or forged sender-related information in electronic messages sent by the bulk message sender.

11. The method of claim 1 wherein:
determining whether the bulk message sender is complying with the set of bulk message policies includes determining whether the bulk message sender is complying with a set of bulk message policies including a requirement that the bulk message sender provide non-Internet contact information in electronic messages, and
electronically aggregating information associated with the sending, by the bulk message sender, of electronic messages includes electronically aggregating information associated with whether the bulk message sender has provided non-Internet contact information in electronic messages sent by the bulk message sender.

12. The method of claim 1 wherein:
determining whether the bulk message sender is complying with the set of bulk message policies includes determining whether the bulk message sender is complying with a set of bulk message policies including a requirement that the bulk message sender provide valid instructions on how a recipient may prevent future electronic messages from being sent to the recipient by the bulk message sender, and
electronically aggregating information associated with the sending, by the bulk message sender, of electronic messages includes electronically aggregating information associated with whether the bulk message sender has provided valid instructions on how a recipient may prevent future electronic messages from being sent to the recipient by the bulk message sender in electronic messages sent by the bulk message sender.

13. The method of claim 1 wherein:
determining whether the bulk message sender is complying with the set of bulk message policies includes determining whether the bulk message sender is complying with a set of bulk message policies including a requirement that the bulk message sender not send electronic messages from a site with a dynamically assigned Internet Protocol address, and
electronically aggregating information associated with the sending, by the bulk message sender, of electronic messages includes electronically aggregating information associated with whether the bulk message sender has sent electronic messages from a site with a dynamically assigned Internet Protocol address.

14. The method of claim 1 wherein:
determining whether the bulk message sender is complying with the set of bulk message policies includes determining whether the bulk message sender is complying with a set of bulk message policies including a requirement that not more than a predetermined amount of electronic messages be returned to the bulk message sender as undeliverable over a predetermined time interval, and
electronically aggregating information associated with the sending, by the bulk message sender, of electronic messages includes electronically tracking information associated with the amount of electronic messages returned to the bulk message sender as undeliverable over the predetermined time interval.

15. The method of claim 1 wherein:
determining whether the bulk message sender is complying with the set of bulk message policies includes determining whether the bulk message sender is complying with a set of bulk message policies including a requirement that the bulk message sender accept more than a predetermined amount of electronic messages that are returned to the bulk message sender as undeliverable over a predetermined time interval, and
electronically aggregating information associated with the sending, by the bulk message sender, of electronic messages includes electronically tracking information associated with the amount of electronic messages accepted by the bulk message sender that are returned to the bulk message sender as undeliverable over the predetermined time interval.

16. The method of claim 1 wherein:
determining whether the bulk message sender is complying with the set of bulk message policies includes determining whether the bulk message sender is complying with a set of bulk message policies including a requirement that the bulk message sender provide information in electronic messages relating to the bulk message sender's acquisition of an address of an intended recipient, and
electronically aggregating information associated with the sending, by the bulk message sender, of electronic messages includes electronically aggregating information associated with whether the bulk message sender has provided information relating to the bulk message sender's acquisition of the address of the intended recipient in electronic messages sent by the bulk message sender.

17. The method of claim 1 wherein:
determining whether the bulk message sender is complying with the set of bulk message policies includes determining whether the bulk message sender is complying with a set of bulk message policies including a requirement that relays used by the bulk message sender to send electronic messages be closed to third party relaying, and
electronically aggregating information associated with the sending, by the bulk message sender, of electronic messages includes electronically aggregating information associated with whether the bulk message sender has sent electronic messages using relays open to third party relaying.

18. The method of claim 1 wherein:
determining whether the bulk message sender is complying with the set of bulk message policies includes determining whether the bulk message sender is complying with a set of bulk message policies including a requirement that relays used by the bulk message sender to send electronic messages not hardcode mail exchange records of a mail system configured to receive the electronic messages, and
electronically aggregating information associated with the sending, by the bulk message sender, of electronic messages includes electronically aggregating information associated with whether the bulk message sender has sent electronic messages using relays that hardcode mail exchange records of the mail system configured to receive the electronic messages.

19. The method of claim 1 wherein:
determining whether the bulk message sender is complying with the set of bulk message policies includes determining whether the bulk message sender is complying with a set of bulk message policies including a requirement that the bulk message sender not send future electronic messages to an address of a recipient if an electronic message sent to the address is designated as undeliverable due to a permanent delivery failure, and
electronically aggregating information associated with the sending, by the bulk message sender, of electronic messages includes electronically tracking information associated with whether the bulk message sender has sent electronic messages to an address of a recipient designated as undeliverable due to a permanent delivery failure.

20. The method of claim 1 wherein electronically aggregating information associated with the sending, by the bulk message sender, of electronic messages includes electronically tracking pattern information related to electronic messages sent by the bulk message sender.

21. The method of claim 20 wherein electronically tracking pattern information related to electronic messages sent by the bulk message sender includes electronically tracking information relating to a number of electronic messages sent by the bulk message sender and delivered successfully to recipients.

22. The method of claim 20 wherein electronically tracking pattern information related to electronic messages sent by the bulk message sender includes electronically tracking information relating to a number of electronic messages sent by the bulk message sender and designated as undeliverable and returned to the bulk message sender.

23. The method of claim 20 wherein electronically tracking pattern information related to electronic messages sent by the bulk message sender includes electronically tracking recipient feedback regarding electronic messages received from the bulk message sender.

24. The method of claim 1 wherein accessing, from a data record, sender compliance information that is additional to the white list information and associated with the bulk message sender includes accessing a sender compliance data record that includes information identifying the bulk message sender and a sender compliance flag that indicates whether the sending, by the bulk message sender, of electronic messages has complied with the set of bulk message policies.

25. The method of claim 24 wherein:
accessing the sender compliance data record includes accessing a sender compliance data record that includes multiple compliance flags that indicate multiple levels or tiers of compliance with the set of bulk message policies, and
determining whether to distinctively treat the first electronic message based on the accessed sender compliance information that is additional to the white list information and associated with the bulk message sender includes:
determining to provide a first level of distinctive treatment to the first electronic message in response to determining that the bulk message sender has maintained a first level or tier of compliance with the set of bulk message policies, and
determining to provide a second level of distinctive treatment to the first electronic message in response to determining that the bulk message sender has maintained a second level or tier of compliance with the set of bulk message policies, the second level of distinctive treatment being different from the first level of distinctive treatment and the second level or tier of compliance being different from the first level or tier of compliance.

26. The method of claim 1 wherein:
applying filtering, including white listing based on white list information, to inbound electronic messages includes white listing based on a white list, and
accessing, from a data record, sender compliance information that is additional to the white list information and associated with the bulk message sender includes accessing information associated with the bulk message sender from an approved bulk mail sender list, the approved bulk mail sender list being different from the white list.

27. The method of claim 1 wherein receiving the first electronic message sent by the bulk message sender includes receiving one of an electronic mail message and an instant message.

28. The method of claim 1 wherein rendering the display based on the distinctive treatment includes rendering a display of the first electronic message.

29. The method of claim 1 wherein rendering the display based on the distinctive treatment includes at least one of placing an icon proximate to summary or title information for the first electronic message displayed in a user interface, displaying text of the first electronic message in a distinct color, and placing the first electronic message in a separate folder.

30. The method of claim 1 wherein obtaining the agreement between the messaging service provider and the bulk message sender that the bulk message sender agrees to comply with the set of bulk message policies in exchange for distinctive treatment of electronic messages sent by the bulk message sender includes obtaining the agreement between the messaging service provider and the bulk message sender by one or more system operators of an electronic mail system.

31. The method of claim 1 wherein obtaining the agreement between the messaging service provider and the bulk message sender that the bulk message sender agrees to comply with the set of bulk message policies in exchange for distinctive treatment of electronic messages sent by the bulk message sender includes manually obtaining the agreement between the messaging service provider and the bulk message sender.

32. The method of claim 1 wherein obtaining the agreement between the messaging service provider and the bulk message sender that the bulk message sender agrees to comply with the set of bulk message policies in exchange for distinctive treatment of electronic messages sent by the bulk message sender includes electronically obtaining the agreement between the messaging service provider and the bulk message sender.

33. The method of claim 1 wherein obtaining the agreement between the messaging service provider and the bulk message sender that the bulk message sender agrees to comply with the set of bulk message policies in exchange for distinctive treatment of electronic messages sent by the bulk message sender includes:
- presenting a display of the set of bulk message policies to the bulk message sender; and
- receiving, from the bulk message sender, an indication that the bulk message sender agrees to comply with the set of bulk message policies.

34. The method of claim 1 wherein the sender compliance information is further provided by electronically, without human intervention, analyzing the electronically aggregated information associated with the sending, by the bulk message sender, of electronic messages sent prior to receiving the first electronic message, wherein:
- determining whether the bulk message sender is complying with the set of bulk message policies based on the electronically aggregated information associated with the sending, by the bulk message sender, of electronic messages sent prior to receiving the first electronic message includes electronically, without human intervention, determining whether the bulk message sender is complying with the set of bulk message policies based on the electronic analysis of the electronically aggregated information associated with the sending, by the bulk message sender, of electronic messages sent prior to receiving the first electronic message.

35. The method of claim 1 further comprising generating a report that describes compliance of the bulk message sender with the set of bulk message policies over a predetermined time interval, and sending the report to the bulk message sender.

36. The method of claim 35 wherein generating the report that describes compliance of the bulk message sender with the set of bulk message policies includes generating a report that includes a breakdown or list of the bulk message policies that the bulk mail sender is following, and a breakdown or list of the bulk message policies that the bulk mail sender is violating.

37. The method of claim 35 wherein generating the report that describes compliance of the bulk message sender with the set of bulk message policies includes generating a removal report that indicates that the bulk message sender has been removed from a list of approved bulk message senders and that messages sent by the bulk message sender no longer receive distinctive treatment.

38. The method of claim 35 wherein generating the report that describes compliance of the bulk message sender with the set of bulk message policies over the predetermined time interval includes generating the report based on the electronically aggregated information associated with the sending, by the bulk message sender, of electronic messages sent prior to receiving the first electronic message.

39. The method of claim 38 wherein generating the report based on the electronically aggregated information associated with the sending, by the bulk message sender, of electronic messages sent prior to receiving the first electronic message includes automatically generating and sending the report without human intervention.

40. The method of claim 1 further comprising generating a report that describes compliance of the bulk message sender with the set of bulk message policies in response to behavior of the bulk message sender crossing a predetermined threshold of noncompliance, and sending the report to the bulk message sender.

41. The method of claim 1 wherein distinctively treating the first electronic message in response to determining to distinctively treat the first electronic message comprises distinctively treating the first electronic message conditioned on the bulk message agreeing to comply with the set of bulk message policies.

42. A method for distinctively treating electronic messages sent by bulk message senders, the method comprising:
- applying filtering, including white listing based on white list information, to inbound electronic messages, the white listing comprising providing, to the inbound electronic messages, a first level of distinctive treatment that is preferential to regular treatment of electronic messages;
- obtaining an agreement between a messaging service provider and a bulk message sender that the bulk message sender agrees to comply with a set of bulk message policies in exchange for distinctive treatment of electronic messages sent by the bulk message sender;
- receiving a first electronic message sent by the bulk message sender, the first electronic message being received subsequent to obtaining the agreement between the messaging service provider and the bulk message sender;
- accessing, from a data record, sender compliance information that is additional to the white list information and associated with the bulk message sender, the sender compliance information being determined by:
  - electronically aggregating information associated with the sending, by the bulk message sender, of electronic messages sent prior to receiving the first electronic message,
  - electronically analyzing the electronically aggregated information associated with the sending, by the bulk message sender, of electronic messages sent prior to receiving the first electronic message;
  - electronically determining whether the bulk message sender is complying with a set of bulk message policies based on the electronic analysis of the electronically aggregated information associated with the sending, by the bulk message sender, of electronic messages sent prior to receiving the first electronic message, and
  - determining the sender compliance information that is additional to the white list information and associated with the bulk message sender based on the determination of whether the bulk message sender is complying with the set of bulk message policies;

determining whether to provide a second level of distinctive treatment to the first electronic message based on the agreement of the bulk message sender to comply with the set of bulk message policies in exchange for distinctive treatment of electronic messages sent by the bulk message sender and the accessed sender compliance information that is additional to the white list information and associated with the bulk message sender, the second level of distinctive treatment being preferential to the first level of distinctive treatment;

providing the second level of distinctive treatment to the first electronic message in response to determining to provide the second level of distinctive treatment to the first electronic message; and rendering a display based on the second level of distinctive treatment.

43. A method for distinctively treating digital communications sent by bulk message senders, the method comprising:

obtaining an agreement between a messaging service provider and a bulk message sender that the bulk message sender agrees to comply with a set of policies in exchange for distinctive treatment of electronic messages sent by the bulk message sender;

in response to obtaining the agreement between the messaging service provider and the bulk message sender, storing, in a data record, information indicating that digital communications sent by the bulk message sender receive distinctive treatment based on the bulk message sender complying with the set of policies;

receiving digital communications sent by the bulk message sender subsequent to obtaining the agreement between the messaging service provider and the bulk message sender;

determining whether to treat the digital communications sent by the bulk message sender distinctively based on the information included in the data record;

distinctively treating the digital communications sent by the bulk message sender in response to determining to treat the digital communications sent by the bulk message sender distinctively;

electronically tracking information related to the sending, by the bulk message sender, of the distinctively treated digital communications;

accessing the electronically tracked information related to the sending, by the bulk message sender, of the distinctively treated digital communications;

determining whether the bulk message sender is complying with the set of policies based on the accessed information; and updating the information included in the data record to indicate that digital communications sent by the bulk message sender receive regular, as opposed to distinctive, treatment in response to determining that the bulk message sender is not complying with the set of policies.

44. The method of claim 43 wherein distinctively treating the digital communications sent by the bulk message sender in response to determining to treat the digital communications sent by the bulk message sender distinctively includes allowing the digital communications sent by the bulk message sender to bypass spam filtering operations.

45. The method of claim 43 wherein distinctively treating the digital communications sent by the bulk message sender in response to determining to treat the digital communications sent by the bulk message sender distinctively includes graphically distinguishing, in a user interface provided at a recipient system, the digital communications sent by the bulk message sender from digital communications sent by other senders whose digital communications do not receive distinctive treatment.

46. The method of claim 45 wherein graphically distinguishing, in the user interface provided at the recipient system, the digital communications sent by the bulk message sender from digital communications sent by other senders whose digital communications do not receive distinctive treatment includes placing an icon proximate to summary or title information for the digital communications sent by the bulk message sender displayed in the user interface, thereby graphically distinguishing the digital communications sent by the bulk message sender from digital communications sent by other senders whose digital communications do not receive distinctive treatment.

47. The method of claim 45 wherein graphically distinguishing, in the user interface provided at the recipient system, the digital communications sent by the bulk message sender from digital communications sent by other senders whose digital communications do not receive distinctive treatment includes displaying text of the digital communications sent by the bulk message sender in a distinct color that is different from a color of displayed text of digital communications sent by other senders whose digital communications do not receive distinctive treatment.

48. The method of claim 45 wherein graphically distinguishing, in the user interface provided at the recipient system, the digital communications sent by the bulk message sender from digital communications sent by other senders whose digital communications do not receive distinctive treatment includes placing the digital communications sent by the bulk message sender in a separate folder from digital communications sent by other senders whose digital communications do not receive distinctive treatment.

49. The method of claim 43 wherein:

electronically tracking information related to the sending, by the bulk message sender, of the distinctively treated digital communications includes electronically tracking information associated with a format of the distinctively treated digital communications sent by the bulk message sender, accessing the electronically tracked information related to the sending, by the bulk message sender, of the distinctively treated digital communications includes accessing the electronically tracked information associated with the format of the distinctively treated digital communications sent by the bulk message sender, and determining whether the bulk message sender is complying with the set of policies based on the accessed information includes determining whether the bulk message sender is complying with a set of policies relating to a format of digital communications based on the accessed information associated with the format of the distinctively treated digital communications sent by the bulk message sender.

50. The method of claim 43 wherein:

electronically tracking information related to the sending, by the bulk message sender, of the distinctively treated digital communications includes electronically tracking information associated with a method the bulk message sender used to send the distinctively treated digital communications, accessing the electronically tracked information related to the sending, by the bulk message sender, of the distinctively treated digital communications includes accessing the electronically tracked information associated with the method the bulk message sender used to send the distinctively treated digital communications, and determining whether the bulk message sender is complying with the set of policies based on the accessed information includes determining whether the bulk message sender is complying with a set of policies relating to a method of sending digital communications based on the accessed information associated with the method the bulk message sender used to send the distinctively treated digital communications.

51. The method of claim 43 wherein:

electronically tracking information related to the sending, by the bulk message sender, of the distinctively treated digital communications includes electronically tracking information associated with whether the distinctively treated digital communications sent by the bulk message sender have hidden or forged sender-related information, accessing the electronically tracked information related to the sending, by the bulk message sender, of the distinctively treated digital communications includes accessing the electronically tracked information associated with whether the distinctively treated digital communications sent by the bulk message sender have hidden or forged sender-related information, and determining whether the bulk message sender is complying with the set of policies based on the accessed information includes determining whether the bulk message sender is complying with a set of policies including a requirement that the bulk message sender not hide or forge sender-related information based on the accessed information associated with whether the distinctively treated digital communications sent by the bulk message sender have hidden or forged sender-related information.

52. The method of claim 43 wherein:

electronically tracking information related to the sending, by the bulk message sender, of the distinctively treated digital communications includes electronically tracking information associated with whether the bulk message sender has provided non-Internet contact information in the distinctively treated digital communications sent by the bulk message sender, accessing the electronically tracked information related to the sending, by the bulk message sender, of the distinctively treated digital communications includes accessing the electronically tracked information associated with whether the bulk message sender has provided non-Internet contact information in the distinctively treated digital communications sent by the bulk message sender, and determining whether the bulk message sender is complying with the set of policies based on the accessed information includes determining whether the bulk message sender is complying with a set of policies including a requirement that the bulk message sender provide non-Internet contact information in digital communications based on the accessed information associated with whether the bulk message sender has provided non-internet contact information in the distinctively treated digital communications sent by the bulk message sender.

53. The method of claim 43 wherein:

electronically tracking information related to the sending, by the bulk message sender, of the distinctively treated digital communications includes electronically tracking information associated with whether the bulk message sender has provided valid instructions on how a recipient may prevent future digital communications from being sent to the recipient by the bulk message sender in the distinctively treated digital communications sent by the bulk message sender, accessing the electronically tracked information related to the sending, by the bulk message sender, of the distinctively treated digital communications includes accessing the electronically tracked information associated with whether the bulk message sender has provided valid instructions on how a recipient may prevent future digital communications from being sent to the recipient by the bulk message sender in the distinctively treated digital communications sent by the bulk message sender, and determining whether the bulk message sender is complying with the set of policies based on the accessed information includes determining whether the bulk message sender is complying with a set of policies including a requirement that the bulk message sender provide valid instructions on how a recipient may prevent future digital communications from being sent to the recipient by the bulk message sender based on the accessed information associated with whether the bulk message sender has provided valid instructions on how a recipient may prevent future digital communications from being sent to the recipient by the bulk message sender in the distinctively treated digital communications sent by the bulk message sender.

54. The method of claim 43 wherein:

electronically tracking information related to the sending, by the bulk message sender, of the distinctively treated digital communications includes electronically tracking information associated with whether the bulk message sender sent the distinctively treated digital communications from a site with a dynamically assigned Internet Protocol address, accessing the electronically tracked information related to the sending, by the bulk message sender, of the distinctively treated digital communications includes accessing the electronically tracked information associated with whether the bulk message sender sent the distinctively treated digital communications from a site with a dynamically assigned Internet Protocol address, and determining whether the bulk message sender is complying with the set of policies based on the accessed information includes determining whether the bulk message sender is complying with a set of policies including a requirement that the bulk message sender not send digital communications from a site with a dynamically assigned Internet Protocol address based on the accessed information associated with whether the bulk message sender sent the distinctively treated digital communications from a site with a dynamically assigned Internet Protocol address.

55. The method of claim 43 wherein:

electronically tracking information related to the sending, by the bulk message sender, of the distinctively treated digital communications includes electronically tracking information associated with whether the bulk message sender sent the distinctively treated digital communications from a site with a dynamically assigned Internet Protocol address, accessing the electronically tracked information related to the sending, by the bulk message sender, of the distinctively treated digital communications includes accessing the electronically tracked information associated with whether the bulk message sender sent the distinctively treated digital communications from a site with a dynamically assigned Internet Protocol address, and determining whether the bulk message sender is complying with the set of policies based on the accessed information includes determining whether the bulk message sender is complying with a set of policies including a requirement that the bulk message sender not send digital communications from a site with a dynamically assigned Internet Protocol address based on the accessed information associated with whether the bulk message sender sent the distinctively treated digital communications from a site with a dynamically assigned Internet Protocol address.

56. The method of claim 43 wherein:

electronically tracking information related to the sending, by the bulk message sender, of the distinctively treated digital communications includes electronically tracking information associated with an amount of the distinctively treated digital communications accepted by the bulk message sender that are returned to the bulk message sender as undeliverable over a predetermined time interval, accessing the electronically tracked information related to the sending, by the bulk message sender, of the distinctively treated digital communications includes accessing the electronically tracked information associated with the amount of the distinctively treated digital communications accepted by the bulk message sender that are returned to the bulk message sender as undeliverable over the predetermined time interval, and determining whether the bulk message sender is complying with the set of policies based on the accessed information includes determining whether the bulk message sender is complying with a set of policies including a requirement that the bulk message sender accept more than a predetermined amount of digital communications that are returned to the bulk message sender as undeliverable over the predetermined time interval based on the accessed information associated with the amount of the distinctively treated digital communications accepted by the bulk message sender that are returned to the bulk message sender as undeliverable over the predetermined time interval.

57. The method of claim 43 wherein:

electronically tracking information related to the sending, by the bulk message sender, of the distinctively treated digital communications includes electronically tracking information associated with whether the bulk message sender provided information relating to the bulk message sender's acquisition of an address of an intended recipient in the distinctively treated digital communications sent by the bulk message sender, accessing the electronically tracked information related to the sending, by the bulk message sender, of the distinctively treated digital communications includes accessing the electronically tracked information associated with whether the bulk message sender provided information relating to the bulk message sender's acquisition of the address of the intended recipient in the distinctively treated digital communications sent by the bulk message sender, and determining whether the bulk message sender is complying with the set of policies based on the accessed information includes determining whether the bulk message sender is complying with a set of policies including a requirement that the bulk message sender provide information in digital communications relating to the bulk message sender's acquisition of an address of the intended recipient based on the accessed information associated with whether the bulk message sender provided information relating to the bulk message sender's acquisition of the address of the intended recipient in the distinctively treated digital communications sent by the bulk message sender.

58. The method of claim 43 wherein:

electronically tracking information related to the sending, by the bulk message sender, of the distinctively treated digital communications includes electronically tracking information associated with whether the bulk message sender sent the distinctively treated digital communications using relays open to third party relaying, accessing the electronically tracked information related to the sending, by the bulk message sender, of the distinctively treated digital communications includes accessing the electronically tracked information associated with whether the bulk message sender sent the distinctively treated digital communications using relays open to third party relaying, and determining whether the bulk message sender is complying with the set of policies based on the accessed information includes determining whether the bulk message sender is complying with a set of policies including a requirement that relays used by the bulk message sender to send digital communications be closed to third party relaying based on the accessed information associated with whether the bulk message sender sent the distinctively treated digital communications using relays open to third party relaying.

59. The method of claim 43 wherein:

electronically tracking information related to the sending, by the bulk message sender, of the distinctively treated digital communications includes electronically tracking information associated with whether the bulk message sender sent the distinctively treated digital communications using relays that hardcode mail exchange records of a mail system configured to receive the distinctively treated digital communications, accessing the electronically tracked information related to the sending, by the bulk message sender, of the distinctively treated digital communications includes accessing the electronically tracked information associated with whether the bulk message sender sent the distinctively treated digital communications using relays that hardcode mail exchange records of the mail system configured to receive the distinctively treated digital communications, and determining whether the bulk message sender is complying with the set of policies based on the accessed information includes determining whether the bulk message sender is complying with a set of policies including a requirement that relays used by the bulk message sender to send digital communications not hardcode mail exchange records of a mail system configured to receive the digital communications based on the accessed information associated with whether the bulk message sender sent the distinctively treated digital communications using relays that hardcode mail exchange records of the mail system configured to receive the distinctively treated digital communications.

60. The method of claim 43 wherein:

electronically tracking information related to the sending, by the bulk message sender, of the distinctively treated digital communications includes electronically tracking information associated with whether the bulk message sender sent the distinctively treated digital communications to an address of a recipient designated as undeliverable due to a permanent delivery failure, accessing the electronically tracked information related to the sending, by the bulk message sender, of the distinctively treated digital communications includes accessing the electronically tracked information associated with whether the bulk message sender sent the distinctively treated digital communications to an address of a recipient designated as undeliverable due to a permanent delivery failure, and determining whether the bulk message sender is complying with the set of policies based on the accessed information includes determining whether the bulk message sender is complying with a set of policies including a requirement that the bulk message sender not send future digital communications to an address of a recipient if a digital communication sent to the address is designated as undeliverable due to a permanent delivery failure based on the accessed information associated with whether the bulk message sender sent the distinctively treated digital communications to an address of a recipient designated as undeliverable due to a permanent delivery failure.

61. The method of claim 43 wherein electronically tracking information related to the sending, by the bulk message sender, of the distinctively treated digital communications includes electronically tracking pattern information related to the distinctively treated digital communications sent by the bulk message sender.

62. The method of claim 61 wherein electronically tracking pattern information related to the distinctively treated digital communications sent by the bulk message sender includes electronically tracking information relating to a number of the distinctively treated digital communications sent by the bulk message sender and delivered successfully to recipients.

63. The method of claim 61 wherein electronically tracking pattern information related to the distinctively treated digital communications sent by the bulk message sender includes electronically tracking information relating to a number of the distinctively treated digital communications sent by the bulk message sender and designated as undeliverable and returned to the bulk message sender.

64. The method of claim 61 wherein electronically tracking pattern information related to the distinctively treated digital communications sent by the bulk message sender includes electronically tracking recipient feedback regarding the distinctively treated digital communications received from the bulk message sender.

65. The method of claim 43 wherein:

storing, in the data record, information indicating that digital communications sent by the bulk message sender receive distinctive treatment includes storing, in a sender compliance data record, information identifying the bulk message sender and a sender compliance flag that indicates that digital communications sent by the bulk message sender receive distinctive treatment, and updating the information included in the data record to indicate that digital communications sent by the bulk message sender receive regular, as opposed to distinctive, treatment in response to determining that the bulk message sender is not complying with the set of policies includes updating the sender compliance flag to indicate that digital communications sent by the bulk message receive regular treatment.

66. The method of claim 43 wherein receiving digital communications sent by the bulk message sender includes receiving one of electronic mail messages and instant messages.

67. The method of claim 43 further comprising:

receiving a first digital communication sent by the bulk message sender subsequent to updating the information included in the data record to indicate that digital communications sent by the bulk message sender receive regular, as opposed to distinctive, treatment in response to determining that the bulk message sender is not complying with the set of policies; and treating the first digital communication regularly.

68. The method of claim 67 wherein:

distinctively treating the digital communications sent by the bulk message sender in response to determining to treat the digital communications sent by the bulk message sender distinctively includes allowing the digital communications sent by the bulk message sender to bypass spam filtering operations, and treating the first digital communication regularly includes performing spam filtering operations on the first digital communication.

69. The method of claim 67 wherein:

distinctively treating the digital communications sent by the bulk message sender in response to determining to treat the digital communications sent by the bulk message sender distinctively includes displaying the digital communications sent by the bulk message sender in a user interface of a recipient system with an icon proximate to summary or title information for the digital communications sent by the bulk message sender, and treating the first digital communication regularly includes displaying the first digital communication sent by the bulk message sender in the user interface of the recipient system without an icon proximate to summary or title information for the first digital communication.

70. The method of claim 43 wherein:

determining whether to treat the digital communications sent by the bulk message sender distinctively based on the information included in the data record includes determining whether to treat the digital communications sent by the bulk message sender with a low level of preferential treatment or a high level of preferential treatment based on the information included in the data record, and distinctively treating the digital communications sent by the bulk message sender in response to determining to treat the digital communications sent by the bulk message sender distinctively includes:

providing the low level of preferential treatment to the digital communications sent by the bulk message sender in response to determining to treat the digital communications sent by the bulk message sender with the low level of preferential treatment, the low level of preferential treatment being different from regular treatment, and providing the high level of preferential treatment to the digital communications sent by the bulk message sender in response to determining to treat the digital communications sent by the bulk message sender with the high level of preferential treatment, the high level of preferential treatment being different from regular treatment and different from the low level of preferential treatment.

71. The method of claim 43 wherein distinctively treating the digital communications sent by the bulk message sender in response to determining to treat the digital communications sent by the bulk message sender distinctively includes distinctively treating at least one digital communication in which the sending of the at least one digital communication did not comply with the set of policies.

72. The method of claim 43 wherein:
electronically tracking information related to the sending, by the bulk message sender, of the distinctively treated digital communications includes:
   electronically tracking information related to the sending, by the bulk message sender, of a first distinctively treated digital communication sent only to a first recipient, and
   electronically tracking information related to the sending, by the bulk message sender, of a second distinctively treated digital communication sent only to a second recipient, the second distinctively treated digital communication being different from the first distinctively treated digital communication and the second recipient being different from the first recipient,
accessing the electronically tracked information related to the sending, by the bulk message sender, of the distinctively treated digital communications includes:
   accessing the electronically tracked information related to the sending, by the bulk message sender, of the first distinctively treated digital communication sent only to the first recipient, and
   accessing the electronically tracked information related to the sending, by the bulk message sender, of the second distinctively treated digital communication sent only to the second recipient, and
determining whether the bulk message sender is complying with the set of policies based on the accessed information includes determining whether the bulk message sender is complying with the set of policies based on the accessed information related to the sending, by the bulk message sender, of the first distinctively treated digital communication sent only to the first recipient and the accessed information related to the sending, by the bulk message sender, of the second distinctively treated digital communication sent only to the second recipient.

73. A communications system that distinctively treats digital communications sent by bulk message senders, the communications system comprising:
   a computer-readable storage medium configured to store data records; and
   a message processing system including at least one processor, the message processing system being configured to perform operations comprising:
      in response to obtaining an agreement between a messaging service provider and a bulk message sender that the bulk message sender agrees to comply with a set of policies in exchange for distinctive treatment of electronic messages sent by the bulk message sender, storing, in a data record, information indicating that digital communications sent by the bulk message sender receive distinctive treatment based on the bulk message sender complying with the set of policies;
      receiving digital communications sent by the bulk message sender subsequent to obtaining the agreement between the messaging service provider and the bulk message sender;
      receiving digital communications sent by the bulk message sender;
      determining whether to treat the digital communications sent by the bulk message sender distinctively based on the information included in the data record;
      distinctively treating the digital communications sent by the bulk message sender in response to determining to treat the digital communications sent by the bulk message sender distinctively;
      electronically tracking information related to the sending, by the bulk message sender, of the distinctively treated digital communications;
      storing, in the data store, the electronically tracked information;
      accessing, from the data store, the electronically tracked information related to the sending, by the bulk message sender, of the distinctively treated digital communications;
      determining whether the bulk message sender is complying with the set of policies based on the accessed information; and
      updating the information included in the data record in the data store to indicate that digital communications sent by the bulk message sender receive regular, as opposed to distinctive, treatment in response to determining that the bulk message sender is not complying with the set of policies.

74. The method of claim 42 wherein:
electronically aggregating information includes electronically aggregating the information without human intervention;
electronically analyzing the electronically aggregated information includes electronically analyzing the electronically aggregated information without human intervention; and
electronically determining whether the bulk message sender is complying with the set of bulk message policies based on the electronic analysis of the electronically aggregated information includes electronically determining whether the bulk message sender is complying with the set of bulk message policies without human intervention.

75. The method of claim 42 wherein:
providing, to the inbound electronic messages, the first level of distinctive treatment that is preferential to regular treatment of electronic messages includes providing the first level of distinctive treatment to messages received from senders that have maintained at least a first level of compliance with the set of bulk message policies; and
electronically determining whether the bulk message sender is complying with a set of bulk message policies includes electronically determining whether the bulk message sender has maintained at least a second level of compliance with the set of bulk message policies, the second level of compliance being different from the first level of compliance.

76. The method of claim 75 further comprising:
placing a particular sender on a white list;
providing the first level of distinctive treatment to electronic messages received from the particular sender based on the particular sender being placed on the white list;
determining whether the particular sender has maintained at least the second level of compliance with the set of bulk message policies over a first time interval;
in response to determining that the particular sender has maintained at least the second level of compliance with the set of bulk message policies over the first time interval, placing the particular sender on an approved bulk mail sender list; and providing the second level of distinctive treatment to electronic messages received from the particular sender based on the particular sender being placed on the approved bulk mail sender list.

77. The method of claim 42 further comprising generating a report that describes compliance of the bulk message sender with the set of bulk message policies over a predetermined time interval, and sending the report to the bulk message sender.

* * * * *